United States Patent
Choi et al.

(10) Patent No.: US 11,656,319 B2
(45) Date of Patent: May 23, 2023

(54) METHOD FOR ADJUSTING LENGTH OF GOLAY SEQUENCE FOR OBJECT RECOGNITION AND ELECTRONIC DEVICE THEREFOR

(71) Applicant: Samsung Electronics Co., Ltd., Suwon-si (KR)

(72) Inventors: Junsu Choi, Suwon-si (KR); Chiho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 16/918,653

(22) Filed: Jul. 1, 2020

(65) Prior Publication Data

US 2021/0003690 A1 Jan. 7, 2021

(30) Foreign Application Priority Data

Jul. 1, 2019 (KR) .................. 10-2019-0078970

(51) Int. Cl.
*G01S 7/00* (2006.01)
*G01S 13/04* (2006.01)
(Continued)

(52) U.S. Cl.
CPC ............. *G01S 7/006* (2013.01); *G01S 13/04* (2013.01); *H04J 13/0014* (2013.01); *G01S 13/341* (2013.01); *G06V 20/64* (2022.01)

(58) Field of Classification Search
CPC ........ G01S 13/341; G01S 7/006; G01S 13/04; G06V 20/64; H04J 13/0014
See application file for complete search history.

(56) References Cited

U.S. PATENT DOCUMENTS 6,587,072 B1 * 7/2003 Gresham .............. G01S 13/106
342/25 R
10,215,853 B2 2/2019 Stark et al.
(Continued)

FOREIGN PATENT DOCUMENTS

CN 104146729 B * 5/2016
KR 10-2015-0052753 A 5/2015
(Continued)

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, IEEE Std 802.11ad™-2012, Dec. 28, 2012.
(Continued)

*Primary Examiner* — Matthew M Barker
(74) *Attorney, Agent, or Firm* — Jefferson IP Law, LLP

(57) ABSTRACT

A method for adjusting the length of a Golay sequence for object recognition and an electronic device therefor are provided. The method for operating the electronic device includes estimating a predicted distance to an external object, determining, based on the estimated predicted distance, the length of a Golay sequence included in a signal for recognizing the external object, and transmitting at least one signal including a Golay sequence having the determined length, and when a device for wireless communication, included in the electronic device, is utilized to perform a radar function, the length of a Golay sequence is adjusted to enable object recognition as much as a length required according to the use of an application, such that recognition efficiency and data communication efficiency can be optimally provided.

12 Claims, 17 Drawing Sheets

(51) Int. Cl.
*H04J 13/00* (2011.01)
*G01S 13/34* (2006.01)
*G06V 20/64* (2022.01)

(56) References Cited

U.S. PATENT DOCUMENTS

| | | | |
|---|---|---|---|
| 10,401,490 | B2 | 9/2019 | Gillian et al. |
| 2009/0217139 | A1 | 8/2009 | Roh et al. |
| 2010/0111217 | A1 | 5/2010 | Fuente |
| 2011/0019720 | A1 | 1/2011 | Fuente |
| 2012/0249356 | A1* | 10/2012 | Shope ............... G01S 13/04 342/22 |
| 2012/0314541 | A1* | 12/2012 | Matsuura ............ G01S 15/104 367/94 |
| 2013/0176166 | A1* | 7/2013 | Kishigami ........... G01S 13/284 342/202 |
| 2013/0241766 | A1* | 9/2013 | Kishigami ........... G01S 7/0235 342/159 |
| 2015/0029151 | A1* | 1/2015 | Galambos .......... G06F 3/04166 345/174 |
| 2017/0299711 | A1* | 10/2017 | Kishigami .......... G01S 13/5242 |
| 2018/0180713 | A1 | 6/2018 | Cohen et al. |
| 2018/0191419 | A1 | 7/2018 | Eitan et al. |
| 2018/0199377 | A1 | 7/2018 | Sanderovich et al. |
| 2018/0252809 | A1* | 9/2018 | Davis ................. G01S 7/0234 |
| 2020/0150263 | A1* | 5/2020 | Eitan .................. G01S 13/003 |

FOREIGN PATENT DOCUMENTS

| | | |
|---|---|---|
| KR | 10-2019-0070088 A | 6/2019 |
| WO | 2016/000108 A1 | 1/2016 |

OTHER PUBLICATIONS

Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, IEEE P802.11ay™/D2.1, Oct. 2018.
IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE Std 802.11n™-2009, Oct. 29, 2009.
Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, IEEE P802.11ac™/D5.0, Jan. 2013.
Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, IEEE P802.11ax™/D2.2, Feb. 2018.
International Search Report dated Oct. 15, 2020, issued in International Application No. PCT/KR2020/008598.
Nakayama et al.; Novel Variable Spreading Sequence Length System for Improving the Processing Speed of DS-UWB Radar; ITS Telecommunications, 2008; 8th International Conference on IEEE; Oct. 24, 2008; Piscataway, NJ.
Lomayev et al.; EDMG STF and CEF Design for SC PHY in 11ay; doc.:IEEE802.11-16/0994r0; Jul. 27, 2016 Piscataway, NJ.
European Search Report dated May 30, 2022; European Appln. No. 20834117.2-1206 / 3959834 PCT/KR2020008598.

* cited by examiner

| STF (311) | CEF (313) | Header (315) | Data (317) | AGC (319) | TRN (321) |

| L-STF (351) | L-CEF (353) | L-Header (355) | EDMG-Header-A (363) | EDMG-STF (365) | EDMG-CEF (367) | EDMG-Header-B (369) | Data (357) | AGC (359) | TRN (361) |

FIG.3B

METHOD FOR ADJUSTING LENGTH OF GOLAY SEQUENCE FOR OBJECT RECOGNITION AND ELECTRONIC DEVICE THEREFOR

CROSS-REFERENCE TO RELATED APPLICATION(S)

This application is based on and claims priority under 35 U.S.C. § 119(a) of a Korean patent application number 10-2019-0078970, filed on Jul. 1, 2019, in the Korean Intellectual Property Office, the disclosure of which is incorporated by reference herein in its entirety.

BACKGROUND

1. Field

The disclosure relates to a method for adjusting the length of a Golay sequence for object recognition and an electronic device therefor.

2. Description of Related Art

As the use of a cellular phone or a smart phone has become widespread, there are increasing demands for authenticating the face of a user to enhance the security of a smart phone, or for recognizing a peripheral subject or person to perform various applications. In response to such demands, various methods for recognizing an object by using a camera included in a smart phone have been proposed.

A method for recognizing an object by using a camera has problems that a complicated signaling algorithm has to be performed to identify whether or not there is an object to be recognized in an image captured by a camera and that it is difficult to identify liveness. In addition, in case that an object is recognized by using a camera, it is not easy to identify a distance to the object, and thus another device (for example, a depth camera) is used.

Meanwhile, a radar, which is a device for transmitting electromagnetic waves and capable of performing operations, such as identification or classification of the existence or absence, distance, altitude, moving direction, and moving speed of an object by reflection waves or back-scattered waves hitting and coming from the object, generally uses a microwave frequency band (for example, approximately 300 MHz to 40 GHz). For example, a radar for detecting an object around the front corner and the rear corner of a vehicle or detecting an object at a medium or long distance in the front uses a frequency band of 24 GHz or 77 GHz.

In case of a smart phone, an institute of electrical and electronics engineers (IEEE) 802.11n or IEEE 802.11ac system is installed therein for wireless data communication, and thus the smart phone may perform wireless communication by using a 2.4 GHz band and/or a 5 GHz band. In addition, as a wireless data communication system for providing a higher data transmission rate, an IEEE 802.11ad or IEEE 802.11ay system, which has been standardized or is being standardized recently by the institute of electrical and electronics engineers (IEEE), uses a frequency band of 60 GHz and may thus use a wide bandwidth in the range of several GHz values. For example, in an IEEE 802.11ad system, a single bandwidth of 2.16 GHz may be supported, and a much wider bandwidth reaching 8.64 GHz may be used in the IEEE 802.11ay standard increased from the IEEE 802.11ad standard.

In an IEEE 802.1 lay system, a wide bandwidth in the range of several GHz values is used, and thus a transmission speed reaching 100 Gbps may be acquired. By using a wide bandwidth, a high transmission speed may be obtained in proportion to a bandwidth at the time of wireless data communication, and high precision may be acquired in proportion to the bandwidth when an IEEE 802.1 lay signal is utilized for a radar function, such as identification or classification of the existence or absence, distance, altitude, moving direction, and moving speed of an object. Accordingly, an IEEE 802.1 lay system may be utilized for a radar function-utilized scenario, such as face recognition, gesture recognition, or near object detection, requiring high precision.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an institute of electrical and electronics engineers (IEEE) 802.11ad or IEEE 802.11ay wireless communication system using a high frequency signal of 60 GHz, and thus has a considerably negative property in terms of signal attenuation. According to a formula of path loss in a free space, when electromagnetic waves are propagated, signal attenuation increases in proportion to a frequency. Accordingly, at the time of propagation, a 60 GHz band signal fundamentally experiences considerable signal attenuation, and an absorptivity by oxygen in the air is also high, and thus a reachable distance of the signal in the air is considerably short. In particular, in case of a radar operation, a signal transmitted from a transmitter should be reflected from an object and return to a receiver, but due to high signal attenuation that a 60 GHz band signal has in the air, a recognizable distance is considerably restricted when an object is recognized using an IEEE 802.11ad or IEEE 802.11ay system as a radar.

In addition, an IEEE 802.11ad or IEEE 802.11ay wireless communication system is fundamentally a system for data communication. Thus, when the IEEE 802.11ad or IEEE 802.11ay wireless communication system is used as a radar, the IEEE 802.11ad or IEEE 802.11ay wireless communication system occupies wireless resources for data communication, and thus there is a problem that it is difficult to ensure efficiency in data communication.

Another aspect of the disclosure is to provide a method for adaptively adjusting the length of a Golay sequence used to detect an object in an IEEE 802.11ad or IEEE 802.11ay system so as to minimize the restriction of a recognizable distance and the degradation of data communication efficiency.

The technical task to be achieved in this document is not limited to the above-described technical tasks, and unmentioned other technical tasks will be clearly understood from the description below by those having ordinary skill in the technical field to which the disclosure belongs.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module configured to transmit a signal for recognizing an external object, at least one processor operably connected to the wireless communication module, and at least one memory operably connected to the at least one processor, wherein the at least one memory stores instructions for causing the at least one processor, when executed, to estimate a predicted distance to the external object, determine, based on the estimated predicted distance, the length of a Golay sequence included in a signal for recognizing the external object, and control the wireless communication module so as to transmit at least one signal including a Golay sequence having the determined length.

In accordance with another aspect of the disclosure, an electronic device is provided. The electronic device includes a wireless communication module configured to transmit a signal for recognizing an external object, at least one processor operably connected to the wireless communication module, and at least one memory operably connected to the at least one processor, wherein the at least one memory stores instructions for causing the at least one processor, when executed, to transmit, to the external object, at least two signals including Golay sequences having different lengths from each other, so as to determine the length of a Golay sequence included in a signal for recognizing the external object, and control the wireless communication module so as to transmit at least one signal including a Golay sequence having the determined length.

In accordance with another aspect of the disclosure, a method for operating an electronic device is provided. The method for operating an electronic device includes estimating a predicted distance to an external object, determining, based on the estimated predicted distance, the length of a Golay sequence included in a signal for recognizing the external object, and transmitting at least one signal including a Golay sequence having the determined length.

In accordance with another aspect of the disclosure, a method for operating an electronic device is provided. The method for operating an electronic device includes transmitting, to an external object, at least two signals including Golay sequences having different lengths from each other, so as to determine the length of a Golay sequence included in a signal for recognizing the external object, and transmitting at least one signal including a Golay sequence having the determined length.

In accordance with another aspect of the disclosure, a device for wireless communication is provided. The electronic device includes a utilized to perform a radar function, the length of a Golay sequence is adjusted to enable object recognition as much as a distance required according to the use of an application, such that recognition efficiency and data communication efficiency can be optimally provided.

The effect acquirable in the disclosure is not limited to the above-described effects, and unmentioned other effects will be clearly understood from the description below by those having ordinary skill in the technical field to which the disclosure belongs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A is a view illustrating a structure of a physical layer packet (physical layer protocol data unit (PPDU)) used in an institute of electrical and electronics engineers (IEEE) 802.11ad system according to an embodiment of the disclosure;

FIG. 3B is a view illustrating a structure of a physical layer packet (physical layer protocol data unit (PPDU)) used in an IEEE 802.11ay system according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
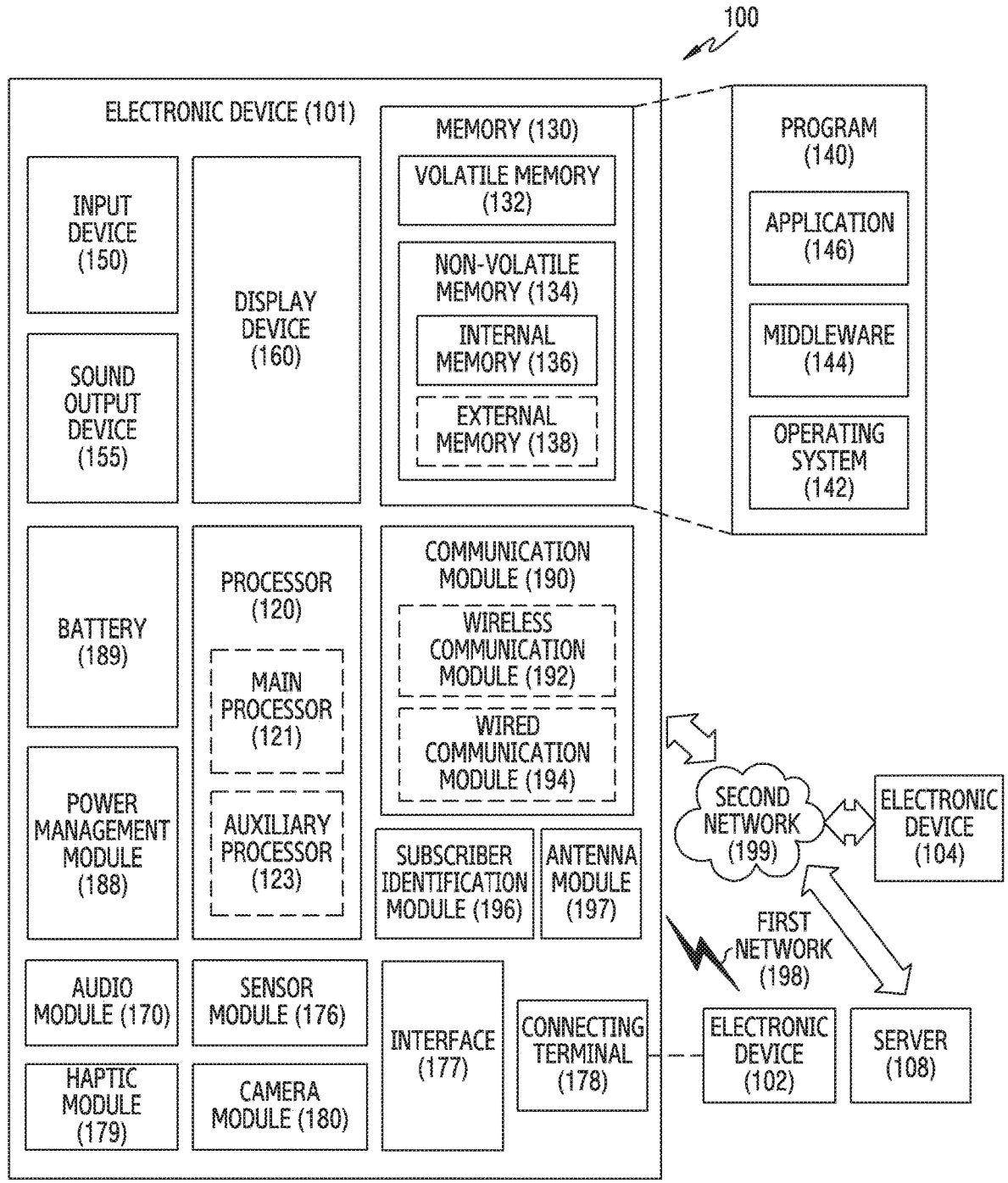
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
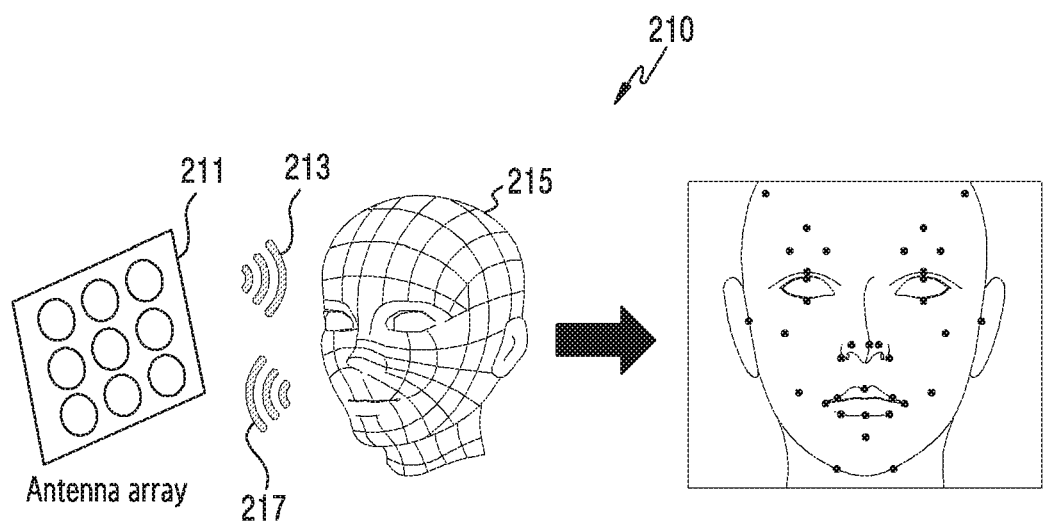
FIG. 2A is a view illustrating various embodiments to which a method proposed by the disclosure is applied according to an embodiment of the disclosure.
Figure 2B:
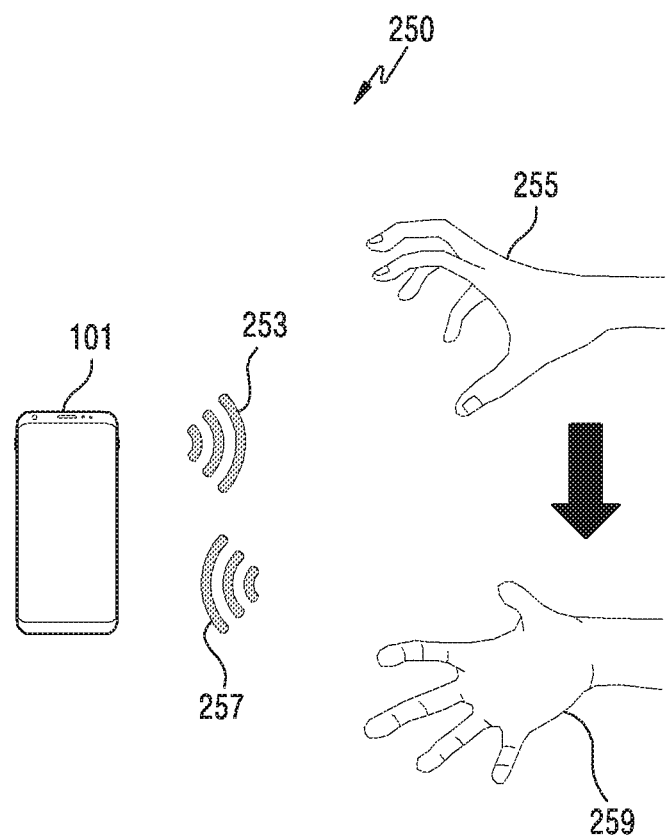
FIG. 2B is a view illustrating various embodiments to which a method proposed by the disclosure is applied according to an embodiment of the disclosure.
Figure 2C:
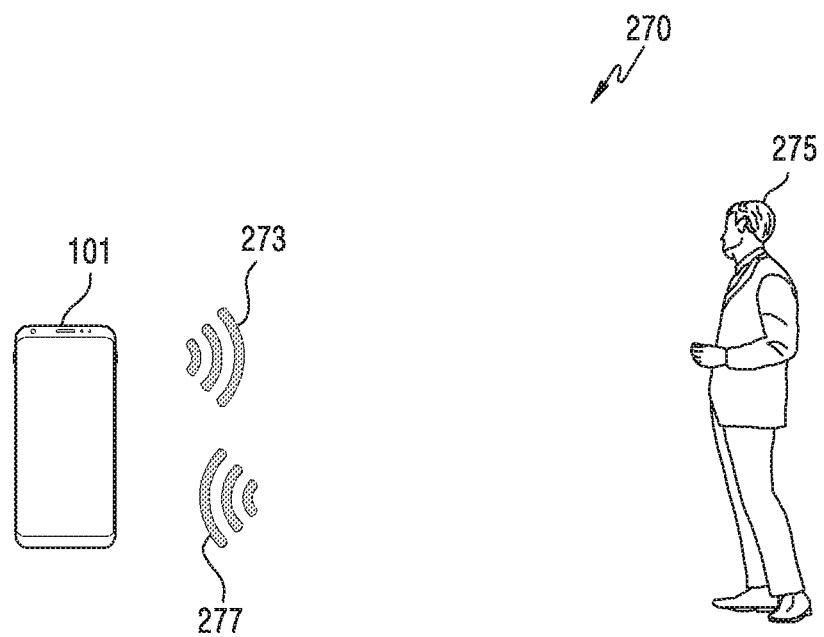
FIG. 2C is a view illustrating various embodiments to which a method proposed by the disclosure is applied according to an embodiment of the disclosure.

FIG. 2A is a view illustrating various embodiments 210, 250, and 270 to which a method proposed by the disclosure is applied according to an embodiment of the disclosure, FIG. 2B is a view illustrating various embodiments 210, 250, and 270 to which a method proposed by the disclosure is applied according to an embodiment of the disclosure, and FIG. 2C is a view illustrating various embodiments 210, 250, and 270 to which a method proposed by the disclosure is applied according to an embodiment of the disclosure.

Referring to FIG. 2A, an electronic device (for example, an electronic device 101 of FIG. 1) may transmit signals 213 of a wireless communication system through an antenna array 211 provided at the electronic device, and may recognize, based on a signal 217 which is the reflection of the transmitted signals from a face 215 of a near person, the face 215 of the near person. At this time, the electronic device may transmit the multiple signals 213, and may distinguish and classify (for example, user authentication), based on phase information of the signal 217 which is the received reflection of each of the transmitted signals, not only existence or non-existence but also people. According to an embodiment of the disclosure, at least a part of the antenna array 211 may transmit the signals 213, and at least a part thereof may receive the reflected signal 217.

Referring to FIG. 2B, while transmitting signals 253 of a wireless communication system multiple times, an electronic device (for example, an electronic device 101 of FIG. 1) may recognize, based on a signal 257 which is the reflection of the transmitted signals from a hand 255 or 259, a motion of the hand and/or a change of the hand from a first shape 255 to a second shape 259. The electronic device may transmit the signals 253 multiple times, and may recognize, based on phase information of the signal 257 which is the received reflection of each of the transmitted signals and received signal-specific phase change information, a change in a gesture or a motion of the hand.

Referring to FIG. 2C, an electronic device (for example, an electronic device 101 of FIG. 1) may transmit signals 273 of a wireless communication system, may acquire, by using a signal 277 which is the reflection of the transmitted signals from an object 275 in a remote distance, a distance to the object, and may use the acquired distance to perform a function, such as focusing of a camera.

A wireless communication system usable in embodiments illustrated in FIGS. 2A to 2C may be an IEEE 802.11n or IEEE 802.11ac system, and may be an IEEE 802.11ad or IEEE 802.11ay system which may replace IEEE 802.11n or IEEE 802.11ac so as to support a higher wireless data transmission amount.

An IEEE 802.11n or IEEE 802.11ac system may transmit a signal by using a bandwidth of 20, 40, 80, or 160 MHz in a frequency band of 2.4 GHz or 5 GHz, and thus a method proposed by the disclosure may be applied thereto although resolution for distance measurement may be low.

A system of IEEE 802.11ad or IEEE 802.11ay increased therefrom may use a wide bandwidth in the range of several GHz values by using a frequency band of 60 GHz. For example, an IEEE 802.11ad system may support a single bandwidth reaching 2.16 GHz, and an IEEE 802.11ay system may use a much wider bandwidth of 8.64 GHz. An IEEE 802.11ay system may use a wide bandwidth in the range of several GHz values, and thus may acquire higher resolution and precision at the time of measurement in proportion to the bandwidth.

Hereinafter, various embodiments will be described based on an IEEE 802.11ay system. However, a wireless communication system used in the disclosure is not limited thereto, and another wireless communication system may be used. In addition, a proposed method may be similarly applied.

FIG. 3A is a view illustrating a structure of a physical layer packet (physical layer protocol data unit (PPDU)) 310 used in an IEEE 802.11ad system according to an embodiment of the disclosure.

FIG. 3B is a view illustrating a structure of a physical layer packet (physical layer protocol data unit (PPDU)) 350 used in an IEEE 802.11ay system according to an embodiment of the disclosure.

Figure 3C:
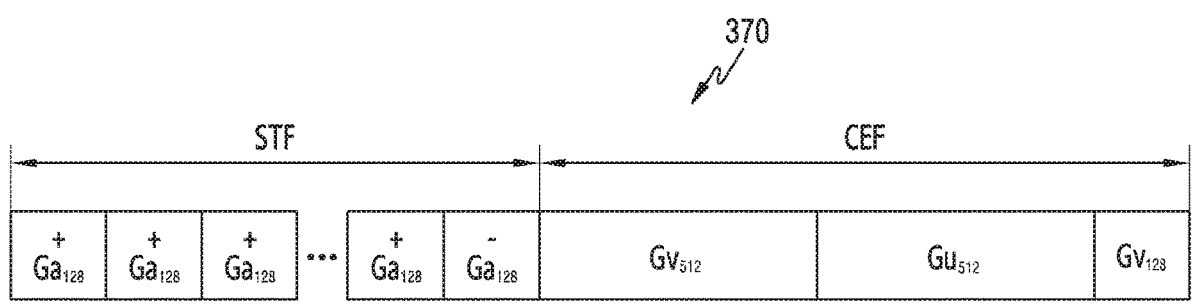
FIG. 3C is a view illustrating a structure of a Golay sequence used in an short training field (STF) and a channel estimation field (CEF) of a physical layer packet used in an IEEE 802.11ad system according to an embodiment of the disclosure.

FIG. 3C is a view illustrating a structure of a Golay sequence 370 used in a short training field (STF) 311 and a channel estimation field (CEF) 313 of a physical layer packet used in an IEEE 802.11ad system according to an embodiment of the disclosure.

Referring to FIG. 3A, a PPDU 310 of an IEEE 802.11ad system may include six fields, which are an STF 311, a CEF 313, a header field 315, a data field 317, an automatic gain control (AGC) field 319, and a reception/transmission training (TRN) field 321. An STF 311 may be used for synchronization between devices for transmitting or receiving signals. A CEF 313 may be used for channel estimation. A data field 317 may include transmitted data. An ACG field 319 and a TRN field 321 may be used for beam enhancement and beam tracing. A header filed 315 may include multiple fields describing about a transmitted PPDU 310, and the fields may be changed according to the way the PPDU 310 is transmitted. An example of the way a PPDU 310 is transmitted may include a control physical layer, an orthogonal frequency division multiplexing (OFDM) physical layer, and a single carrier (SC) physical layer.

Referring to FIG. 3B, a PPDU 350 used in an IEEE 802.11ay system includes fields 311, 313, or 315 of a PPDU 310 used in an IEEE 802.11ad system as are for backward compatibility with the IEEE 802.11ad system. In order to distinguish fields 311, 313, or 315 of an IEEE 802 of the related art. 11ad system PPDU 310 from newly added fields 363, 365, 367, or 369, "L" referring to a legacy may be added to the front of the name of each of the fields 311, 313, or 315, and the fields 311, 313, or 315 may be referred to as an L-STF 351, an L-CEF 353, or an L-Header 355. In addition, a PPDU 350 used in an IEEE 802.11ay system may include a signaling field required to be added to a field of a PPDU 310 of an IEEE 802.11ad system and to support features, such as channel bonding or multi input multi output (MIMO). To this end, a PPDU 350 of an IEEE 802.11ay system may additionally include, between legacy header fields 351, 353, or 355 and a data field 357, an AGC field 359, a TRN field 361, an enhanced directional multi-gigabit (EDMG)-Header-A 363, an EDMG-STF 365, an EDMG-CEF 367, or an EDMG-Header-B 369, as illustrated in FIG. 3B Enhanced directional multi-gigabit (EDMG) is a term added to refer to the major feature of IEEE 802.11ay. An EDMG-STF 365 and an EDMG-CEF 367 serve to perform functions similar to those of an L-STF 351 and an L-CEF 353, and an EDMG-Header-A 363 and an EDMG-Header-B 369 may include multiple fields describing about a transmitted PPDU 350.

An electronic device 101 may transmit a Golay sequence in a CEF 313, an L-CEF 353, or an EDMG-CEF 367 of a PPDU 310 or 350 illustrated in FIG. 3A and FIG. 3B, and an electronic device which receives a PPDU 310 or 350 may perform, by utilizing a Golay sequence, channel estimation required to normally receive a data symbol transmitted from a data field 317 or 357.

Referring to FIG. 3C, for example, in order to allow a reception device for receiving a PPDU to match a reception timing, an STF 311 may include sixteen times of Golay sequences (+Ga128) of a 128 chip and one-time Golay sequence (−Ga128) of another 128 chip, and a CEF 313 may include, for channel estimation, two different Golay sequences (Gu512 and Gv512) of a 512 chip and one Golay sequence (Gv128) of a 128 chip. Accordingly, an STF may have a length satisfying 17.128=2,176 Tc, and a CEF may have a length of 1,152 Tc. Tc may refer to a chip time which is a time consumed to transmit one chip.

FIG. 3C illustrates the composition of a Golay sequence transmitted from an STF 311 and a CEF 313 of an IEEE 802.11ad system, and the composition may also be applied to an L-STF 351 and an L-CEF 353 of an IEEE 802.11ay system enhanced from an IEEE 802.11ad system.

Figure 4A:
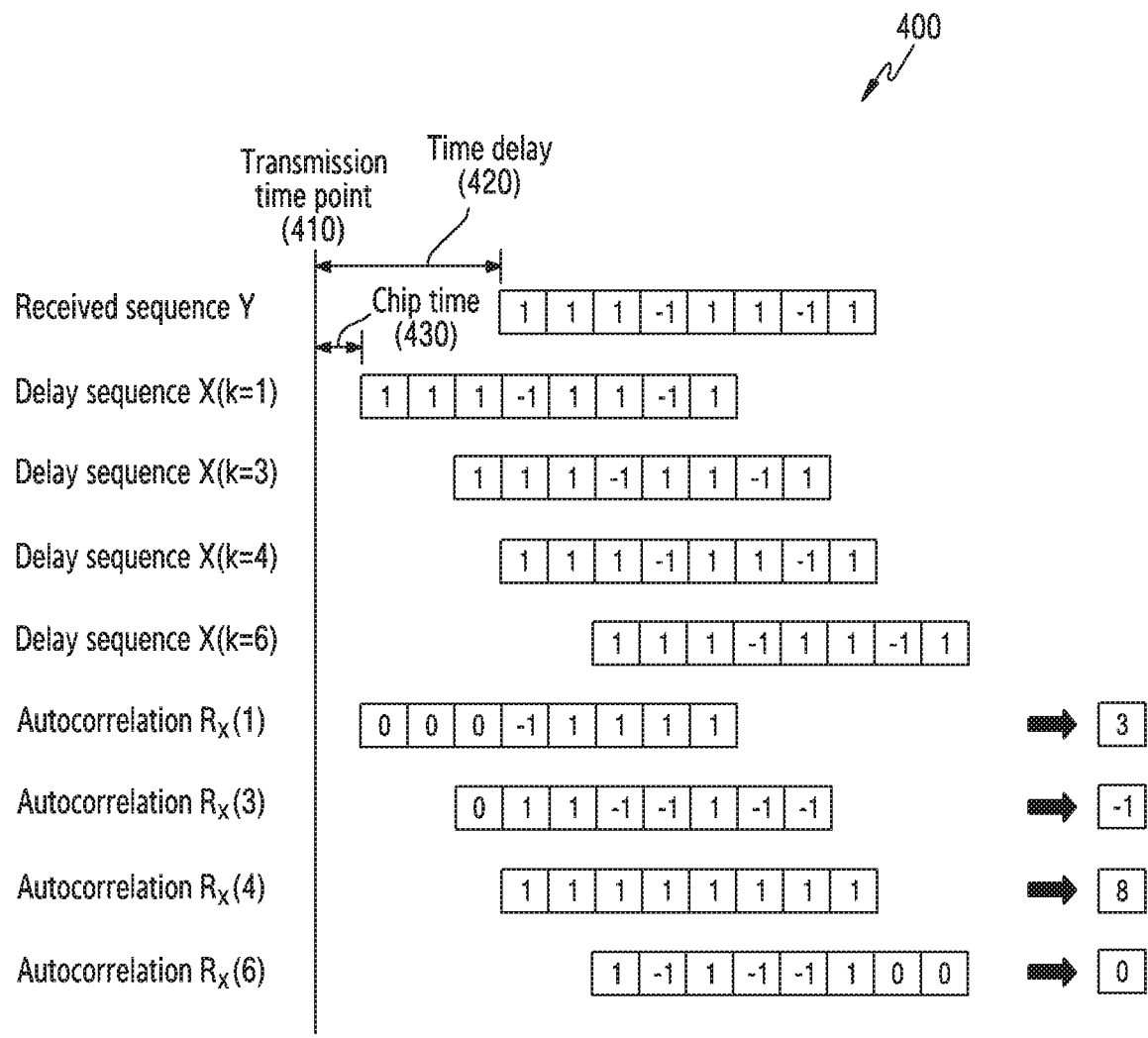
FIG. 4A is a view illustrating an operation of calculating autocorrelation according to an embodiment of the disclosure.

FIG. 4A is a view 400 illustrating an operation of calculating autocorrelation according to an embodiment of the disclosure.

Referring to FIG. 4A, a sequence X having a specific length N (for example, 8) is given, an electronic device 101 may transmit a signal including the sequence X to a transmission time point 410, the transmitted signal may be reflected from an object to be recognized, and the electronic device 101 may receive a reflection signal including a sequence Y. The signal which the electronic device 101 receives may be received after a delay of a specific time (for example, 4·chip time) 420 from the transmission time point 410. A chip time (chip duration) 430 may mean a time consumed to transmit one chip or one symbol, and may be a value in inverse proportion to a bandwidth in which a signal is transmitted. In order to determine a time delay 420 which the received sequence Y experiences, the electronic device 101 may calculate autocorrelation ($R_x(k)$) between the received sequence Y and a delay sequence X(k) delayed from the sequence X as much as a chip time k. Autocorrelation may be calculated by the sum of the product of identical components of two sequences, and may be represented by the following formula: $R_x(k)=\Sigma_{j=1}^{N} X_j(k)Y_j$. In the formula, Y is a received sequence which is a signal delayed from X as much as a specific time, and X(k) is a signal acquired by delaying the sequence X as much as a chip time k from a transmission time point 410.

Referring to FIG. 4A, if autocorrelation between a sequence X(k=1) and a received sequence Y in case that k=1, the received sequence Y does not yet arrive during first three chips (j=1,2,3), and thus the value of Y is 0 and the value of $X_j(k)Y$ is 0. During later chip times (j=4,5,6,7,9), the received sequence Y arrives, and thus $X_j(k)$ and $Y_j$ have a value of −1 or 1. Final autocorrelation ($R_x(1)$) which is the sum of the calculated values has the value of 3.

Similarly, the electronic device 101 may also calculate autocorrelation of another k value with the received sequence Y, and referring to an example of FIG. 4A, the autocorrelation has values satisfying $R_x(3)=-1$, $R_x(4)=8$, and $R_x(6)=0$. Although not illustrated in FIG. 4A, autocorrelation may be calculated for another k. In addition, the electronic device 101 may estimate a delay time to a recognized object by using a k value when an autocorrelation value calculated for each k value is at the peak. Referring to an example of FIG. 4A, when k is 4, autocorrelation has the value of 8, which is at the peak, and thus the electronic device 101 may estimate, as 4·chip time, a delay time consumed while a signal transmitted at the transmission time point 410 is reflected, returned, and is received from a recognized object.

According to various embodiments of the disclosure, if a Golay sequence is used as the sequence X, autocorrelation is at the peak and has a maximum value in case that a delay time is 0, and autocorrelation has the value of 0 or smaller in case that a delay time is not 0. Thus, an electronic device 101 may easily acquire a delay time by using autocorrelation. According to another embodiment of the disclosure, if a Golay complementary sequence or a sequence referred to as a Golay pair is used as the sequence X, autocorrelation has a large value in case that a delay time is 0, and autocorrelation is 0 in case that a delay time is not 0. Thus, an electronic device 101 may more easily acquire a delay time.

Figure 4B:
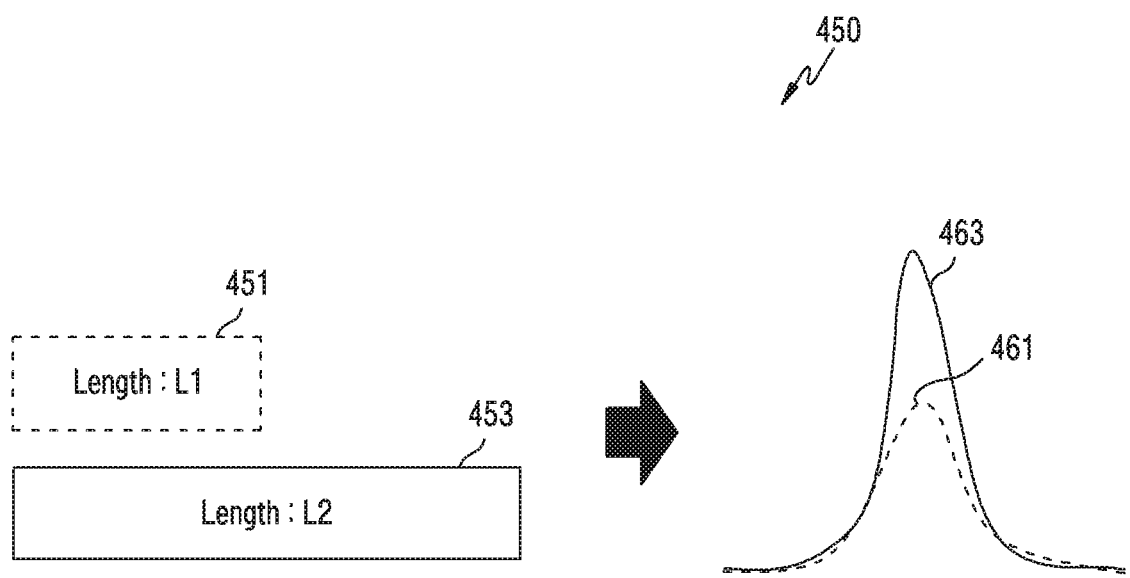
FIG. 4B is a view illustrating an operation illustrating a peak value of autocorrelation according to a Golay sequence length according to an embodiment of the disclosure.

FIG. 4B is a view 450 illustrating an operation illustrating a peak value of autocorrelation according to a Golay sequence length according to an embodiment of the disclosure.

Referring to FIG. 4B, a peak value acquired via autocorrelation may vary according to the length of a Golay sequence. In an embodiment of the disclosure, in case that the length of a Golay sequence is short L1 (for example, 8) 451, an autocorrelation value is small (461). On the other hand, in case that the length of a Golay sequence is long L2 (for example, 128) 453, an autocorrelation value is relatively large (463). Accordingly, if the length of a Golay sequence is long, it is highly likely that the peak value of autocorrelation is detected although there is considerable attenuation due to reflection from an object at a long distance. On the other hand, if the length of a Golay sequence is short, an autocorrelation value may not be a desired value because of attenuation due to reflection from an object at a long distance, and thus it may not be recognized that there is an object. Accordingly, in case that a radar function is performed by utilizing the autocorrelation property of a Golay sequence, if a used Golay sequence is longer, signal attenuation may be overcome and an object at a farther distance may be recognized.

The disclosure serves to increase a Golay sequence length in a signal transmitted by a wireless communication system for a radar operation by utilizing such a property, so as to increase possible distance in which an object is recognizable. By using a method for adjusting a Golay sequence length, an object recognizable distance and accuracy may be enhanced without increasing the intensity of a transmitted signal. For example, it may be possible to overcome a regulation related to a specific absorption rate (SAR) of a mobile device, or limitations in a space and a design, and increase an object recognizable distance.

Figure 5:
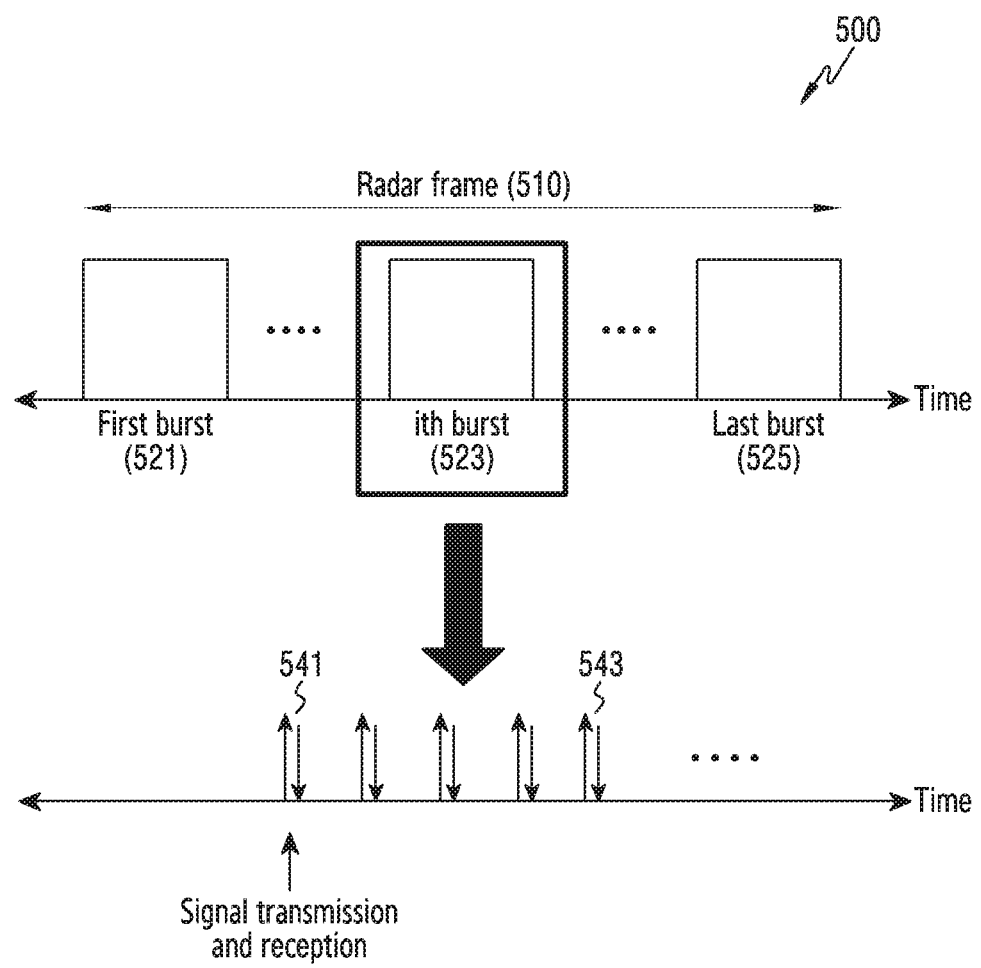
FIG. 5 is a view illustrating a composition of signals transmitted for a radar operation according to an embodiment of the disclosure.

FIG. 5 is a view 500 illustrating a composition of signals transmitted for a radar operation according to an embodiment of the disclosure.

Referring to FIG. 5, a radar frame 510 may be defined. A radar frame 510 may be a set of signals transmitted during a radar operation for object sensing, gesture recognition, face recognition, or living organism detection. A radar frame 510 may be composed of a plurality of bursts (for example, N number of bursts) 521, 523, or 525, and each of the bursts 521, 523, or 525 may include a plurality of signals (for example, k number of signals) 541 to 543.

One radar frame 510 may be transmitted by one sensing request, but multiple radar frames 510 may be transmitted. In case that multiple radar frames 510 are transmitted, a transmission period may be a preconfigured value, and a transmission period may also be changed according to a result of sensing the surrounding environment. In addition, a transmission period between bursts in one radar frame 510 and/or a transmission period between signals in one burst may also be a preconfigured value, and according to another embodiment of the disclosure, a transmission period may be changed according to a result of sensing the surrounding environment.

Referring to FIG. 5, signals (PPDU) transmitted during a radar operation, such as object sensing, gesture recognition, or face recognition may be tens or hundreds of signals, not just one.

Meanwhile, an IEEE 802.11ad or IEEE 802.11ay system is a wireless communication system and performs, as a major function, wireless data communication, but should commonly transmit or receive electromagnetic waves so as to perform a data communication operation and a radar operation. Thus, signal transmission or reception for data communication and signal transmission or reception for a radar operation may not be performed at the same time due to interference. Accordingly, a data communication operation and a radar operation should operate by dividing limited time resources for each other. If a long length Golay sequence is used for a radar signal and signals are transmitted and received several tens of or hundreds of times as illustrated in FIG. 5, many time resources are required for a radar operation, and as a result, many time resources may not be used for a communication operation, and thus efficiency of data communication may be degraded.

Accordingly, there is a trade-off between an object recognition distance and data communication efficiency according to the length of a Golay sequence, and in order to acquire an optimal result on such a trade-off, the disclosure proposes a method for adaptively varying the length of a Golay sequence under various conditions, instead of a method for using a Golay sequence having a constant length.

According to various embodiments of the disclosure, the length of a Golay sequence may be increased or decreased so as to ensure a long object recognition distance according to a desired object recognition distance or to decrease a time used for a radar operation.

Table 1 below shows an example of controlling a Golay sequence length.

TABLE 1

| Required object recognition distance | Application | Golay sequence length | Effect |
|---|---|---|---|
| Short (within 50 cm) | Near detection, face recognition | Short | Short radar operation time |
| Medium (within 2 m) | Gesture recognition | Intermediate | Proper radar operation time and object recognition distance |
| Long (within 10 m) | Room level recognition, camera focus control | Long | Long object recognition distance |

As shown in Table 1 above, in case that a required object recognition distance is short, such as for near detection or face recognition, an effect of shortening a radar operation time by decreasing a Golay sequence length may be acquired. In case that a long object recognition distance within 10 m is required, such as for object recognition in a room or camera focus control, a required object recognition distance may be obtained by increasing a Golay sequence length. In case that a required object recognition distance is a medium distance of approximately 2 m, such as for gesture recognition, a proper radar operation time and object recognition distance may be acquired by adjusting a Golay sequence length to an intermediate degree.

Figure 6:
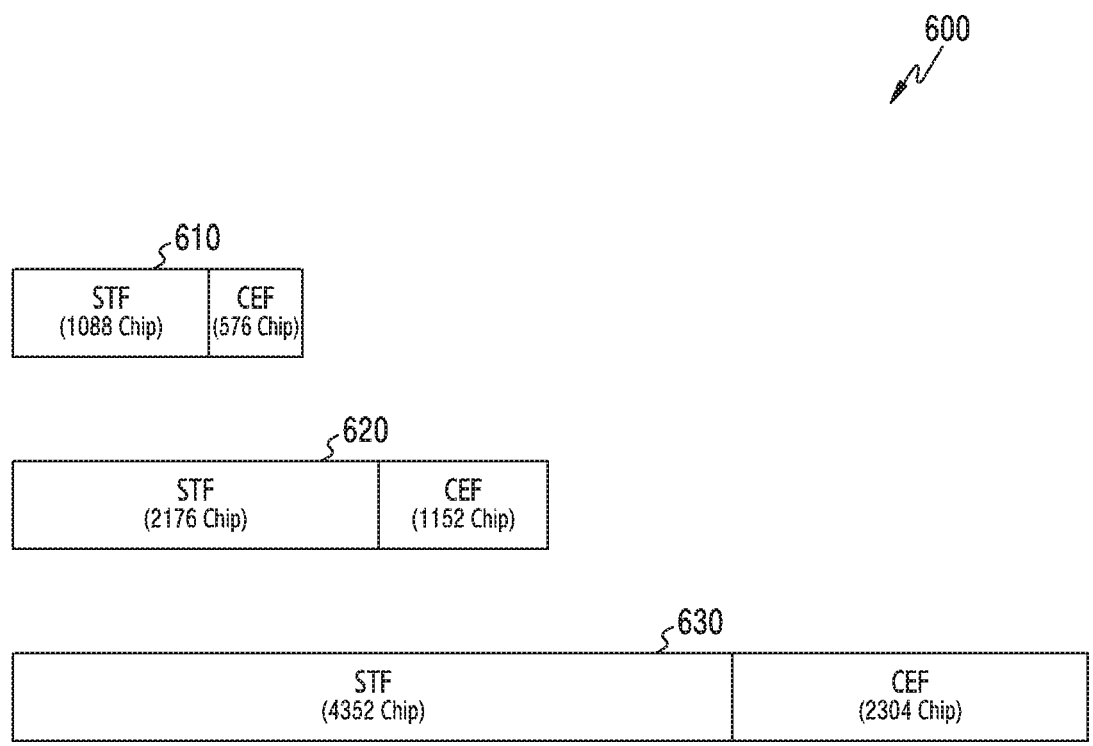
FIG. 6 is a view illustrating a length of a Golay sequence according to an embodiment of the disclosure.

FIG. 6 is a view 600 illustrating a length of a Golay sequence according to an embodiment of the disclosure.

Referring to FIG. 6, in an embodiment of the disclosure, a short Golay sequence 610 may include an STF of a 1088 chip and a CEF of a 576 chip, an intermediate length Golay sequence 620 may include an STF of a 2176 chip and a CEF of a 1152 chip. A long length Golay sequence 630 may have an STF of a 4352 chip and a CEF of a 2304 chip. The intermediate length Golay sequence 620 is a length used in IEEE 802.11ad, and the detailed composition thereof is illustrated in FIG. 3C. In an example of FIG. 6, the short length Golay sequence 610 is acquired by decreasing by half each of the STF and the CEF of the intermediate length Golay sequence 620, and the long length Golay sequence 630 is acquired by increasing twice each of the STF and the CEF of the intermediate length Golay sequence 620. The length of a Golay sequence is not necessarily limited thereto. According to another embodiment of the disclosure, a ratio of increasing or decreasing an STF and a ratio of increasing or decreasing a CEF may be different from each other. According to another embodiment of the disclosure, only a CEF may be included without an STF. In addition, as illustrated in FIG. 3C, an STF has a structure in which, for timing, a short Golay sequence is repeated multiple times, and a CEF has a structure including a long Golay sequence so as to identify a channel property. Thus, according to an embodiment of the disclosure, in case of an STF, the same Golay sequence is used and the entire length thereof may be decreased by decreasing the number of repetitions.

Figure 7:
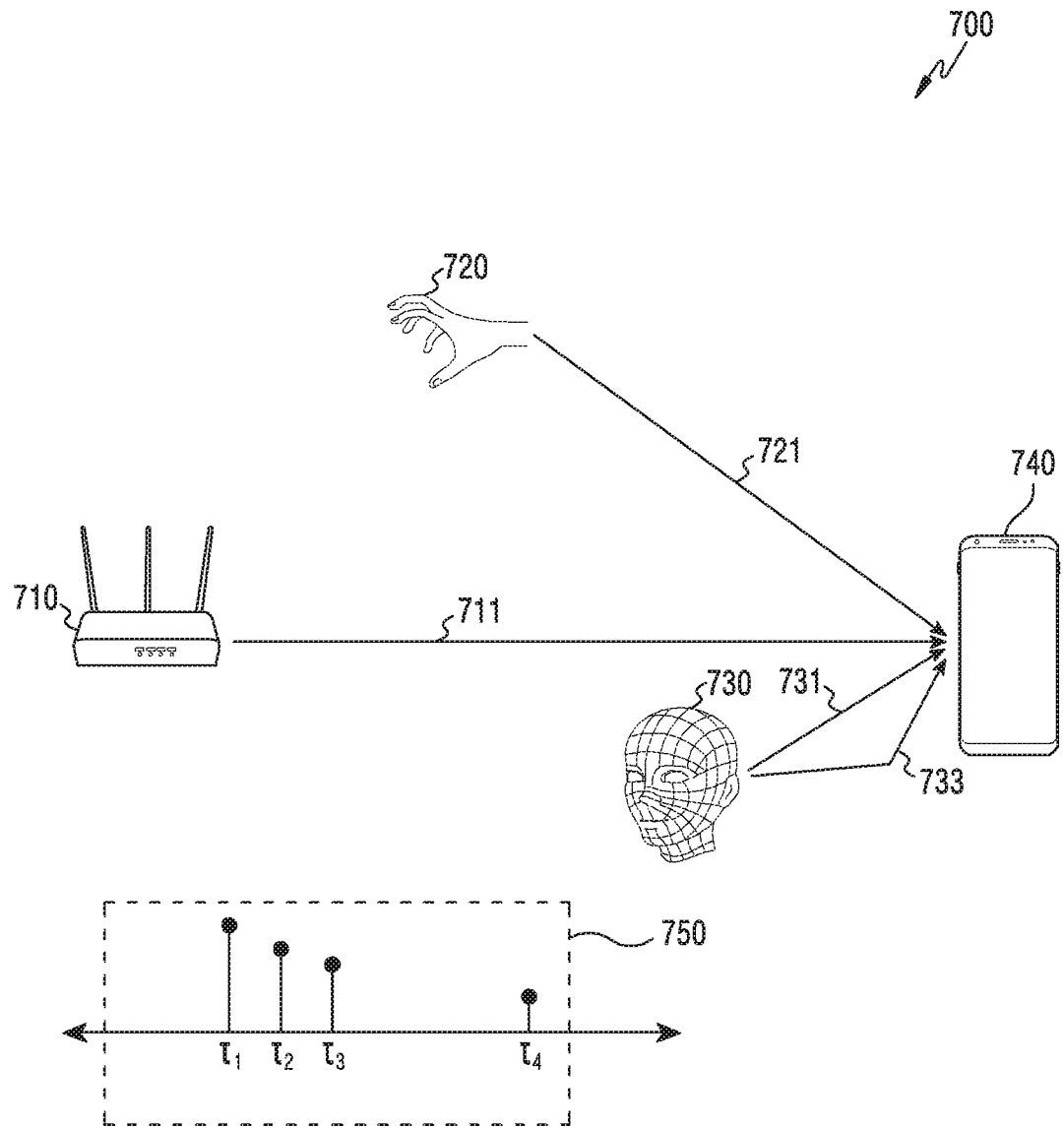
FIG. 7 is a view illustrating an operation of acquiring a property of an object by utilizing a Golay sequence according to an embodiment of the disclosure.

FIG. 7 is a view 700 illustrating an operation of acquiring a property of an object by utilizing a Golay sequence according to an embodiment of the disclosure.

Referring to FIG. 7, when an electronic device 740 transmits a Golay sequence, the sequence may be reflected from a peripheral object 710, 720, or 730, and may be received to the electronic device 740 after passing through another channel path 711, 721, 731, or 733. At this time, a signal reflected from one object 730 may be received to the electronic device 740 through a plurality of channel paths 731 and 733. Thereafter, the electronic device 740 performs autocorrelation for a Golay sequence to receive multiple path components having signal magnitudes and phases and multiple delay components 750 (for example, $\tau_1$, $\tau_2$, $\tau_3$, or $\tau_4$) at a time point at which a peak value appears. At this time, the number of paths (the number of taps) recognizable by the electronic device 740 may vary depending on an application or a solution, and the number of paths (the number of taps) recognizable by the electronic device 740 may be configured in advance. As described in relation to FIG. 4B, when the electronic device 740 perform correlation for various delay times, peaks appear at the same time points (for example, $\tau_1$, $\tau_2$, $\tau_3$, or $\tau_4$) 750 as the delay times of multiple path components. Signal attenuation and phase shift values experienced by a transmitted signal for each path at a time point at which a peak appears may be obtained, and this is generally referred to as a channel impulse response (CIR) in a communication system. The electronic device 740 may transmit a plurality of signals included in a radar frame, and may measure, based on CIR information acquired for each signal, a distance to a peripheral object, or acquire a property for object recognition.

In an IEEE 802.11ad or IEEE 802.11ay system, a Golay sequence is included in a CEF (for example, a CEF 313, an L-CEF 353, or an EDMG-CEF 367) so as to allow a reception device to perform channel estimation. Accordingly, an electronic device 101 including a wireless communication module 192 supporting an IEEE 802.11ad or IEEE 802.11ay system may transmit a PPDU 310 or 350 including a Golay sequence. At this time, a PPDU including only an STF and a CEF may be transmitted to decrease an overhead. In another embodiment of the disclosure, a PPDU including only a CEF may be transmitted. For example, an STF is a field required for the timing of a reception device, and a transmission device and a reception device may be the same device in case of a radar operation, and thus the STF for the timing of a reception device may not be required.

As another example, even in case that a PPDU 310 or 350 is used for general data transmission, channel estimation is possible while including a Golay sequence in a CEF. In this case, a data field 317 or 357 may include data to be transmitted. An electronic device 101 which is to implement a radar function by using a signal of an IEEE 802.11ad or IEEE 802.11ay system may transmit a PPDU 310 or 350 including a Golay sequence, and may receive a signal reflected and returning from a peripheral object. As described above, the electronic device 101 may estimate a CIR by using a correlation property of a Golay sequence or a Golay pair. If a PPDU (310 or 350) including a Golay sequence is transmitted and then correlation of various delay times of the transmitted Golay sequence with a received signal is calculated, the electronic device 101 may have a correlation value which is at the peak in the time delay of each received channel component, and may estimate a CIR by acquiring information on the signal magnitude and phase of a corresponding signal component in the corresponding time delay.

When a delay time in which correlation between a signal reflected and received from a specific object and a transmitted signal corresponds to a peak is T and the speed of electromagnetic waves is $V_1$, a distance in which electromagnetic waves travel while a signal transmitted from the electronic device 101 is reflected and received from an object is $V_1 \cdot \tau$. This distance corresponds to a reciprocation distance with respect to the object, the electronic device 101 may estimate that the object is at a distance of $(V_1 \cdot \tau)/2$. By this principle, an electronic device 101 using a wireless communication module for an IEEE 802.11ad or IEEE 802.11ay system may estimate a distance to an object by utilizing a Golay sequence. In addition, an IEEE 802.11ad or IEEE 802.11ay system may have an advantage because of a large bandwidth used for signal transmission, compared to other wireless communication schemes. In theory, depending on the duality of a chip time (chip duration) and a bandwidth, a chip time is inversely proportional to a bandwidth. As described above, in an IEEE 802.11ad or IEEE 802.11ay system, a bandwidth used for signal transmission has several GHz values, and thus a chip time may be smaller than $10^{-9}$ seconds when a Golay sequence is transmitted. The resolution of a minimum detectable time in a radar function corresponds to a chip time 430 of a Golay sequence, and thus multiplying the chip time 430 by the speed ($V_1$) of electromagnetic waves allows an electronic device 101, to which an IEEE 802.11ad or IEEE 802.11ay system is applied, to recognize the resolution of a detectable distance. This resolution is in centimeters (cm) when a signal of an IEEE 802.11ay system is used, and thus considerable precision may be secured. Moreover, this high precision may increase the possibility to utilize an electronic device 101, to which an IEEE 802.11ad or IEEE 802.11ay wireless communication scheme is applied, in an application, such as gesture or face recognition, requiring high precision.

If a plurality of antennas are used when an electronic device 101 transmits and/or receives signals for a radar function, the electronic device 101 may additionally obtain angle of arrival (AoA) and angle of departure (AoD) information, as well as the time delay, magnitude, and phase of a reflected and received signal. In addition, when the electronic device 101 transmits radar signals several times according to a time and receives a signal which is the reflection of each of the transmitted signals, if information, such as a pattern and a phase is analyzed, the information may be utilized for a basic sensing function of estimating the distances, directions, and/or speeds of various objects in the surroundings, as well as for an application, such as recognizing a gesture or recognizing a face by using the property of a signal reflected from the face. Moreover, by transmitting signals multiple times and receiving a reflection signal, the electronic device 101 may confirm a phase shift according to the minute movement of a living organism, and may utilize and apply this to living organism detection (for example, liveness). This living organism detection application enables distinguishment of a living organism and a picture acquired by capturing the living organism, wherein the distinguishment is not possible via camera imaging.

Figure 8:
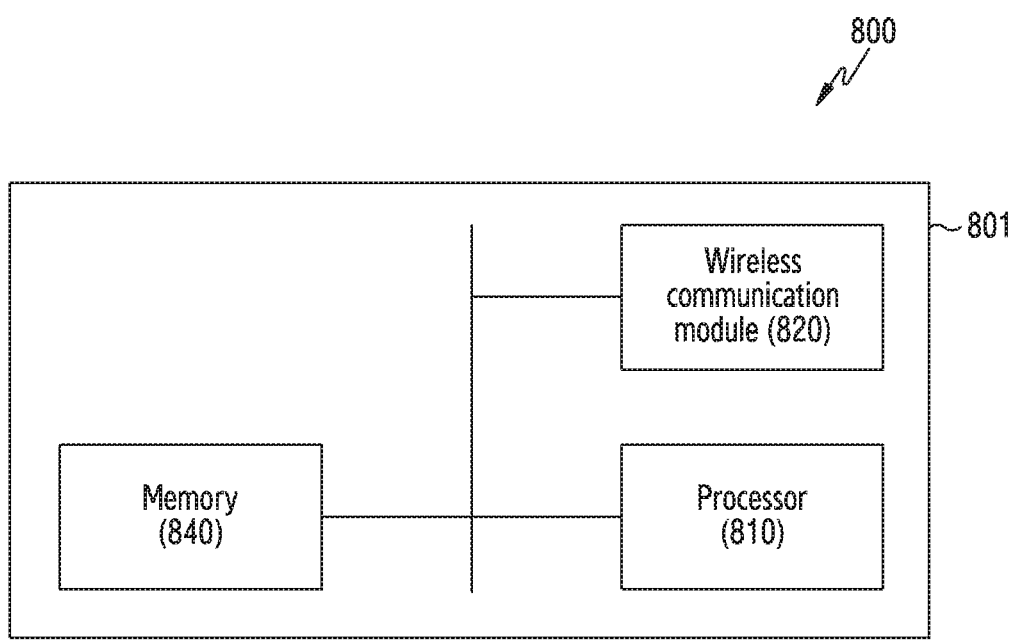
FIG. 8 is a block diagram illustrating an operation of a functional composition of an electronic device according to an embodiment of the disclosure.

FIG. 8 is block diagram 800 illustrating an operation of a functional composition of an electronic device according to an embodiment of the disclosure. FIG. 8 briefly illustrates a functional composition required to implement a method proposed by the disclosure.

Referring to FIG. 8, an electronic device 801 (for example, an electronic device 101 of FIG. 1) may include a processor 810 (for example, a processor 120 of FIG. 1), a wireless communication module 820 (for example, a wireless communication module 192 of FIG. 1), and/or a memory 840 (for example, a memory 130 of FIG. 1). However, the electronic device 801 is not limited thereto, and in the electronic device 801, at least one of the elements may be omitted or one or more other elements may be added.

According to various embodiments of the disclosure, a wireless communication module 820 may transmit or receive a signal according to a wireless communication scheme, such as IEEE 802.11n, IEEE 802.11ac, IEEE 802.11ad, or IEEE 802.11ay. In an embodiment of the disclosure, in order to recognize a peripheral object, to recognize a gesture, to recognize a face, or to detect a living organism, a wireless communication module 820 may produce a signal corresponding to a PPDU 310 or 350 illustrated in FIG. 3A or 3B and transmit the signal through at least one antenna. A wireless communication module 820 may transmit a signal in a specific direction by using beamforming, or may transmit a signal in all directions.

According to various embodiments of the disclosure, a wireless communication module 820 may allow a Golay sequence or a Golay complementary sequence to be included in a CEF (for example, a CEF 313, an L-CEF 353, or an EDMG-CEF 367) of a PPDU 310 or 350, which is produced to implement a radar function. Otherwise, a wireless communication module 820 may insert a sequence specially designed to implement a radar function into a data field 317 or 357.

According to various embodiments of the disclosure, a wireless communication module 820 may transmit all of PPDUs illustrated in FIGS. 3A to 3B, but according to an embodiment of the disclosure, a wireless communication module 820 may transmit a signal including only an STF 311 and a CEF 313, a signal including only an L-STF 351 and an L-CEF 353, or a signal including only an EDMG-STF 365 and an EDMG-CEF 367. In addition, a wireless communication module 820 may simply transmit a signal including only a CEF 313, an L-CEF 353, or an EDMG-CEF 367.

According to various embodiments of the disclosure, a wireless communication module 820 may transmit a signal including an STF and/or a CEF illustrated in FIG. 3C or FIG. 6.

According to various embodiments of the disclosure, a wireless communication module 820 may produce and transmit a radar frame 510 including a plurality of signals as illustrated in FIG. 5, so as to implement a radar function for object sensing, gesture recognition, face recognition, or living organism detection.

According to various embodiments of the disclosure, a processor 810 may control a wireless communication module 820 so as to transmit and receive signals, and may receive signal transmission and reception times and a CIR from the wireless communication module 820.

According to various embodiments of the disclosure, a processor 810 may determine the length of a Golay sequence to be included in a signal to be transmitted from a wireless communication module 820. In an embodiment of the disclosure, a processor 810 may determine that Golay sequences having different lengths are included in each of transmitted signals in one radar frame 510. However, in another embodiment of the disclosure, a processor 810 may determine that Golay sequences having the same length are included in all transmitted signals in one radar frame 510. At this time, the length of a short Golay sequence carried on an STF and the length of a long Golay sequence carried on a CEF may be respectively determined, or only the length of a long Golay sequence carried on a CEF may be determined. The length of a short Golay sequence carried on an STF may be always constant, or may increase or decrease in proportion to the determined length of a long length Golay sequence carried on a CEF.

According to various embodiments of the disclosure, a processor 810 may select, based on the type of application, one among a plurality of preconfigured Golay sequence lengths, and may determine the selected length as a Golay sequence length to be included in a signal to be transmitted. In an embodiment of the disclosure, as shown in Table 1, in case of an application, such as near detection or face recognition, in which a required object recognition distance is short, a processor 810 may select a short one (for example, 610 of FIG. 6) from among a plurality of preconfigured Golay sequence lengths, and may determine the selected length as a Golay sequence length to be included in a signal to be transmitted. As another embodiment of the disclosure, in case of an application, such as object recognition in a room or camera focus control, in which a long object recognition distance within 10 m is required, a processor 810 may select a long one (for example, 630 of FIG. 6) from among a plurality of preconfigured Golay sequence lengths, and may determine the selected length as a Golay sequence length to be included in a signal to be transmitted. In another embodiment of the disclosure, in case of an application, such as gesture recognition, in which a required object recognition distance is a medium distance of approximately 2 m, a processor 810 may select an intermediate one (for example, 620 of FIG. 6) from among a plurality of preconfigured Golay sequence lengths, and may determine the selected length as a Golay sequence length to be included in a signal to be transmitted.

According to various embodiments of the disclosure, a processor 810 may select, based on a predicted distance or position of an object to be detected, one among a plurality of preconfigured Golay sequence lengths, and may determine the selected length as a Golay sequence length to be included in a signal to be transmitted. In an embodiment of the disclosure, in case that a distance to a predicted position where an object exists is short, a processor 810 may select a short one (for example, 610 of FIG. 6) from among a plurality of preconfigured Golay sequence lengths, and may determine the selected length as a Golay sequence length to be included in a signal to be transmitted. In another embodiment of the disclosure, in case that it is identified that a distance to a predicted position where an object exists is long, a processor 810 may select a long one (for example, 630 of FIG. 6) from among a plurality of preconfigured Golay sequence lengths, and may determine the selected length as a Golay sequence length to be included in a signal to be transmitted. In another embodiment of the disclosure, in case that a distance to a predicted position where an object exists is approximately medium, a processor 810 may select an intermediate one (for example, 620 of FIG. 6) from among a plurality of preconfigured Golay sequence lengths, and may determine the selected length as a Golay sequence length to be included in a signal to be transmitted.

In the above-described embodiments of the disclosure, a plurality of preconfigured Golay sequence lengths may vary based on various conditions. In an embodiment of the disclosure, a plurality of preconfigured Golay sequence lengths may be configured as a first set and a second set differently from each other, based on whether or not data communication is performed. In an embodiment of the disclosure, in case that an electronic device 101 is connected to a base station or an access point (AP) and is performing data communication, a set of shorter lengths may be used, and in case that data communication is not being performed, a set of longer lengths may be used. The length of each of a plurality of Golay sequences included in a first set used when data communication is being performed may be shorter than the length of a corresponding Golay sequence from among a plurality of Golay sequences included in a second set used when data communication is not being performed. In another embodiment of the disclosure, a plurality of preconfigured Golay sequence lengths may be configured as a plurality of sets differently from each other, based on a state of an electronic device 101. In an embodiment of the disclosure, in case that the intensity of a noise signal is high due to signal emission using another peripheral device, a set may be configured to include a Golay sequence having a longer length, and in case that the intensity of a noise signal is low, a set may be configured to include a Golay sequence having a relatively short length. In another embodiment of the disclosure, in case that the intensity of power transmittable by an electronic device 101 is restricted by legal regulations, Golay sequence lengths may be configured as a plurality of sets differently from each other, based on the intensity of power available to the electronic device 101.

In the above-descried embodiments of the disclosure, a processor 810 selects one among a plurality of preconfigured Golay sequence lengths. However, a processor 810 may determine a Golay sequence length in proportion to an object recognition distance required by an application or a predicted distance of an object to be detected. In one embodiment of the disclosure, in case that an expected distance is within 1 m, a processor 810 may use one of those illustrated in FIG. 3C or FIG. 6 (for example, 610 of FIG. 6), and then, every time an expected distance increases by 1 m, a Golay sequence length may be increased by a 128 chip.

According to various embodiments of the disclosure, a processor 810 may adaptively determine the length of a Golay sequence.

According to an embodiment of the disclosure, a processor 810 may provide, to a wireless communication module 820, indication of transmitting a signal including a Golay sequence having an initial first length (for example, A). In an embodiment of the disclosure, a wireless communication module 820 may transmit a signal including a Golay sequence having a first length in all or a part of a first burst 521 of a radar frame 510 illustrated in FIG. 5. In case that an object is not recognized by this transmission, for example, if a case in which the intensity of a received signal is larger than a preconfigured signal intensity is not recognized, a processor 810 may provide, to a wireless communication module 820, indication of transmitting a signal including a Golay sequence having a second length (for example, A+L) by increasing the length of the Golay sequence as much as a designated length (for example, L). In an embodiment of the disclosure, a wireless communication module 820 may transmit a signal including a Golay sequence having a second length in all of a second burst or in a part of a first burst 521 of a radar frame 510 illustrated in FIG. 5. In addition, a processor 810 may re-identify whether an object is recognized. A processor 810 may continuously perform the above-described operation of increasing the length of a Golay sequence as much as a designated length, until an object is recognized. In an embodiment of the disclosure, in case that a processor 810 identifies that an object is recognized when the length of a Golay sequence is a third length (for example, A+3L), the processor 810 may provide, to a wireless communication module 820, indication of transmitting a signal including a Golay sequence having a third length at the time of transmission of a later signal of a radar frame 510, so as to identify the property of an identified object.

According to another embodiment of the disclosure, a processor 810 may provide, to a wireless communication module 820, indication of transmitting a signal including a Golay sequence having an initial fourth length (for example, Z). In an embodiment of the disclosure, a wireless communication module 820 may transmit a signal including a Golay sequence having a fourth length in all or a part of a first burst 521 of a radar frame 510 illustrated in FIG. 5, according to the indication of the processor 810. In case that an object is recognized by this transmission, for example, if a case in which the intensity of a received signal is larger than a preconfigured signal intensity is recognized, a processor 810 may provide, to a wireless communication module 820, indication of transmitting a signal including a Golay sequence having a fifth length (for example, Z-M) by decreasing the length of the Golay sequence as much as a designated length (for example, M). In an embodiment of the disclosure, a wireless communication module 820 may transmit a signal including a Golay sequence having a fifth length in all of a second burst or in a part of a first burst 521 of a radar frame 510 illustrated in FIG. 5. In addition, a processor 810 may re-identify whether an object is not recognized. A processor 810 may continuously perform the above-described operation of decreasing the length of a Golay sequence as much as a designated length, until an object is not recognized. In an embodiment of the disclosure, in case that a processor 810 identifies that an object is not recognized when the length of a Golay sequence is a sixth length (for example, Z-3M), the processor 810 may provide, to a wireless communication module 820, indication of transmitting a signal including a Golay sequence having a seventh length (for example, Z-2M) increased from the sixth length by a designated length at the time of transmission of a later signal of a radar frame 510, so as to identify the property of an identified object. The preconfigured signal intensity may be differently configured based on the type of application or a distance to an object to be detected. According to an embodiment of the disclosure, a processor 810 may also differently configure, based on the type of application or a distance to an object to be detected, the length of a Golay sequence to be initially transmitted. According to another embodiment of the disclosure, based on whether or not data communication of a wireless communication module 820 with an external electronic device (for example, an electronic device 102 of FIG. 1) is performed, a processor 810 may determine the length of a Golay sequence to be initially transmitted. Otherwise, based on whether or not data communication of a wireless communication module 820 with an external electronic device is performed, a processor 810 may determine whether to use a method for changing the length of a Golay sequence from a short length to a long length, or whether to use an operation of changing the length of a Golay sequence from a long length to a short length.

According to various embodiments of the disclosure, according to an operation of the processor 810, bursts 521, 523, and 525 of a radar frame 510 may be classified into two types of bursts. A first type of bursts are used to recognize only the existence or absence of an object, wherein the length of a used Golay sequence may vary according to a burst or each of transmitted signals, and the first type of bursts may be named as a search burst. A second type of bursts are bursts for transmitting a radar signal for identifying the property of an object so as to identify the object after the existence or absence of object is identified by an operation by a search burst, and the second type of bursts may be named as a detection burst. During a detection burst, a processor 810 may use Golay sequences having the same length. In addition, based on a result of signal transmission or reception during a search burst, according to the above-described operation, a processor 810 may determine the length of a Golay sequence to be used during a detection burst.

According to various embodiments of the disclosure, a memory 840 may store instructions to be executed by a processor 810, so as to perform the above-described operation. In addition, a memory 840 may include length information of a plurality of preconfigured Golay sequences selectable based on the type of application, a Golay sequence having a specific length, or at least one unit Golay sequence (for example, +Ga128 or −Ga128 of FIG. 3C) combinable to produce a Golay sequence having a specific length.

According to various embodiments of the disclosure, a processor 810 may control a wireless communication module 820 to receive each CIR acquired from the wireless communication module 820 by transmission or reception of each signal.

According to various embodiments of the disclosure, a processor 810 or a wireless communication module 820 of an electronic device 801 may analyze or may statistically process and then analyze CIR information including magnitude information and phase information acquired by transmitting signals of a radar frame 510, and may perform object detection, face recognition, gesture recognition, or living organism detection. At this time, a processor 810 may acquire optimal data transmission efficiency and recognition efficiency by adjusting the length of a Golay sequence included in a signal.

According to various embodiments of the disclosure, an electronic device (for example, an electronic device 101 of FIG. 1 or an electronic device 801 of FIG. 8) may include: a wireless communication module (for example, a wireless communication module 192 of FIG. 1 or a wireless communication module 820 of FIG. 8) configured to transmit a signal for recognizing an external object; at least one processor (for example, a processor 120 of FIG. 1 or a processor 810 of FIG. 8) operably connected to the wireless communication module; and at least one memory (for example, a memory 130 of FIG. 1 or a memory 840 of FIG. 8) operably connected to the at least one processor, wherein the at least one memory stores instructions for causing the at least one processor, when executed, to: estimate a predicted distance to the external object; determine, based on the estimated predicted distance, the length of a Golay sequence included in a signal for recognizing the external object; and control the wireless communication module so as to transmit at least one signal including a Golay sequence having the determined length.

According to various embodiments of the disclosure, the instructions may cause the at least one processor to: control the wireless communication module so as to receive at least one signal which is the reflection and return of the transmitted wireless signal from the external object; acquire, based on the at least one transmitted signal and the at least one received signal, the property of the external object; and recognize, based on the acquired property of the object, the object.

According to various embodiments of the disclosure, the instructions may cause the at least one processor to estimate, based on the type of application using recognition of the external object or based on configuration according to an input by a user, a predicted distance to the external object.

According to various embodiments of the disclosure, the instructions may cause the at least one processor to determine, as the length of a Golay sequence included in a signal for recognizing the external object, one among a plurality of Golay sequence lengths preconfigured based on the estimated predicted distance.

According to various embodiments of the disclosure, the preconfigured Golay sequence lengths may be configured to be different from each other, based on the state of the electronic device, the state including the intensity of a peripheral noise signal.

According to various embodiments of the disclosure, the instructions may cause the at least one processor to determine, in proportion to the estimated predicted distance, the length of a Golay sequence included in a signal for recognizing the external object.

According to various embodiments of the disclosure, the instructions may cause the at least one processor to: identify, through the wireless communication module, whether or not data communication with an external electronic device is being performed; and determine, based on the result of the identification, the length of a Golay sequence included in a signal for recognizing the external object.

According to various embodiments of the disclosure, an electronic device (for example, an electronic device 101 of FIG. 1 or an electronic device 801 of FIG. 8) may include: a wireless communication module (for example, a wireless communication module 192 of FIG. 1 or a wireless communication module 820 of FIG. 8) configured to transmit a signal for recognizing an external object; at least one processor (for example, a processor 120 of FIG. 1 or a processor 810 of FIG. 8) operably connected to the wireless communication module; and at least one memory (for example, a memory 130 of FIG. 1 or a memory 840 of FIG. 8) operably connected to the at least one processor, wherein the at least one memory stores instructions for causing the at least one processor, when executed, to: transmit, to the external object, at least two signals including Golay sequences having different lengths from each other, so as to determine the length of a Golay sequence included in a signal for recognizing the external object; and control the wireless communication module so as to transmit at least one signal including a Golay sequence having the determined length.

According to various embodiments of the disclosure, the instructions may cause the at least one processor to: control the wireless communication module so as to receive at least one signal which is the reflection and return of the transmitted wireless signal from the external object; acquire, based on the at least one transmitted signal and the at least one received signal, the property of the external object; and recognize, based on the acquired property of the object, the object.

According to various embodiments of the disclosure, the instructions may cause the at least one processor to configure a Golay sequence having a first length; control the wireless communication module so as to transmit at least one first signal including the configured Golay sequence having the first length; control the wireless communication module so as to receive at least one first reflection signal which is the reflection and return of the at least one transmitted first signal from the external object; identify whether or not a first peak value obtained by performing correlation between the at least one received first reflection signal and signals delaying the at least one transmitted first signal is larger than a preconfigured value; in case that, as a result of the identification, the first peak value is smaller than the preconfigured value, increase the Golay sequence length as much as a designated length, configure an increased length as a second length, transmit at least one second signal including a Golay sequence having the configured second length, receive at least one second reflection signal which is the reflection and return of the at least one transmitted second signal from the external object, and then identify whether or not a second peak value acquired by performing correlation between the received second reflection signal and signals delaying the transmitted second signal is larger than the preconfigured value; and in case that, as a result of the identification, the second peak value is larger than the preconfigured value, determine, as the second length, the length of a Golay sequence included in a signal for recognizing the external object.

According to various embodiments of the disclosure, the instructions may cause the at least one processor to identify that the external object is not a recognizing target and stop a radar operation, in case that the determined Golay sequence length is larger than a configurable maximum Golay sequence length.

According to various embodiments of the disclosure, the instructions may cause the at least one processor to: configure a Golay sequence having a first length; control the wireless communication module so as to transmit at least one first signal including the configured Golay sequence having the first length; control the wireless communication module so as to receive at least one first reflection signal which is the reflection and return of the at least one transmitted first signal from the external object; identify whether or not a first peak value acquired by performing correlation between the at least one received first reflection signal and signals delaying the transmitted first signal is smaller than a preconfigured value; in case that, as a result of the identification, the first peak value is smaller than the preconfigured value, determine, as the first length, the length of a Golay sequence included in a signal for recognizing the external object; in case that, as a result of the identification, the first peak value is larger than the preconfigured value, decrease the configured Golay sequence length as much as a designated length, configure a decreased length as a second length, transmit at least one second signal including a Golay sequence having the configured second length, receive at least one second reflection signal which is the reflection and return of the at least one transmitted second signal from the external object, and then re-identify whether or not a second peak value acquired by performing correlation between the received second reflection signal and signals delaying the transmitted second signal is smaller than the preconfigured value; and in case that, as a result of the identification, the peak value is smaller than the preconfigured value, determine, as the first length, the length of a Golay sequence included in a signal for recognizing the external object.

According to various embodiments of the disclosure, the instructions may cause the at least one processor to identify that the external object is not a recognizing target and stop a radar operation, in case that, based on a case that the first peak value is smaller than the preconfigured value, the Golay sequence length is determined as the first length.

According to various embodiments of the disclosure, the instructions cause the at least one processor to: identify, through the wireless communication module, whether or not data communication with an external electronic device is being performed; and determine, based on the result of the identification, the first length.

According to various embodiments of the disclosure, the wireless communication module may be operated according to an IEEE 802.11ad or IEEE 802.11ay wireless communication scheme, and the signal may be a physical layer protocol data unit (PPDU) of the IEEE 802.11ad or IEEE 802.11ay.

According to various embodiments of the disclosure, the signal may include only a short training field (STF) for timing adjustment at the time of reception and a channel estimation field (CEF) for estimating a channel impulse response of a received signal, and the Golay sequence having the determined length may be transmitted after being carried on the CEF.

Hereinafter, by using an electronic device 101 or 801 as described above, operations of the electronic device 101 or 801 for determining the length of a Golay sequence used for object recognition will be described.

Figure 9:
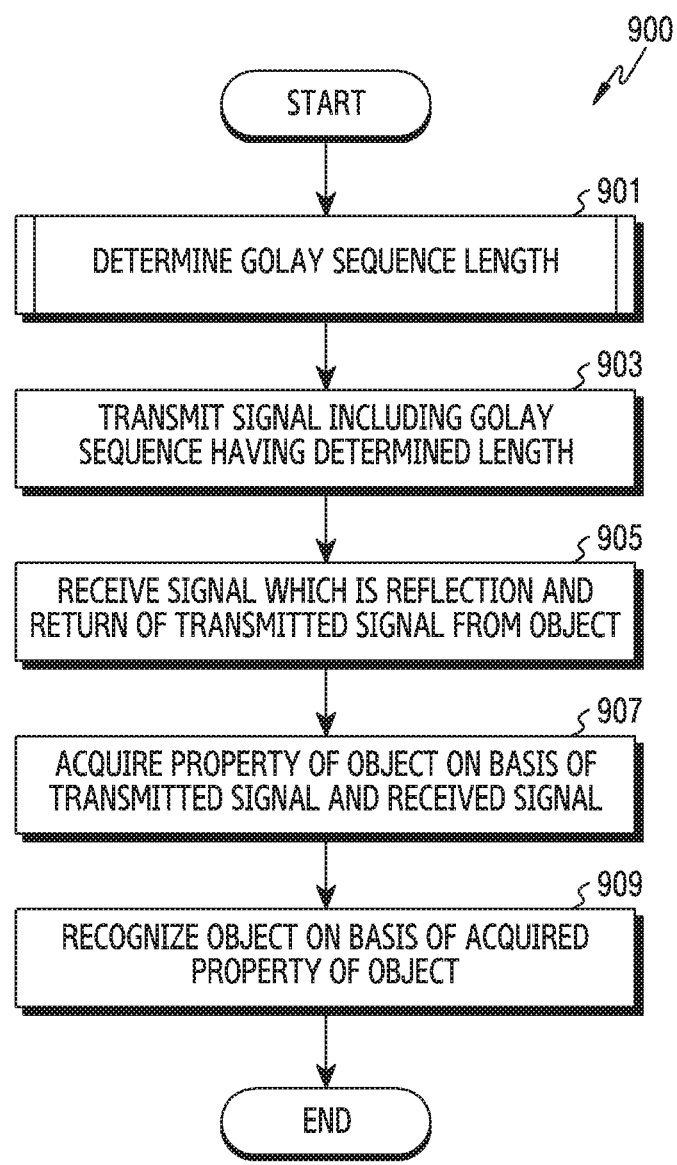
FIG. 9 is a flowchart illustrating an operation of recognizing an object by determining a length of a Golay sequence in an electronic device according to an embodiment of the disclosure.

FIG. 9 is a flowchart 900 illustrating an operation of recognizing an object by determining a length of a Golay sequence in an electronic device according to an embodiment of the disclosure.

Referring to FIG. 9, it may be understood that the operating subject of the flowchart 900 exemplified in FIG. 9 is an electronic device (for example, an electronic device 101 of FIG. 1 or an electronic device 801 of FIG. 8) or a processor (for example, a processor 120 of FIG. 1 or a processor 810 of FIG. 8) of an electronic device.

According to various embodiments of the disclosure, in operation 901, an electronic device 101 or 801 may determine a Golay sequence length included in signals to be transmitted for a radar operation including object detection, face recognition, or gesture recognition through a wireless communication module (for example, a wireless communication module 192 of FIG. 1 or a wireless communication module 620 of FIG. 6). At this time, in an electronic device 101 or 801, the length of a short Golay sequence carried on an STF and the length of a long length Golay sequence carried on a CEF may be respectively determined, or only the length of a long length Golay sequence carried on a CEF may be determined. The length of a short Golay sequence carried on an STF may be always constant, or may increase or decrease in proportion to the determined length of a long length Golay sequence carried on a CEF. Hereinafter, a description will be made based on the determination of the length of a long length Golay sequence carried on a CEF. The length of a short length Golay sequence carried on an STF may be determined in the same way as determining the length of a long length Golay sequence carried on a CEF, may be always constant regardless of conditions, or may be determined in proportion to the determined length of a long length Golay sequence carried on a CEF.

An electronic device 101 or 801 may determine the length of a Golay sequence according to various methods. In an embodiment of the disclosure, based on the type of application using a radar operation, an electronic device 101 or 801 may determine the length of a Golay sequence. In another embodiment of the disclosure, based on an expected distance or position of an object to be detected, an electronic device 101 or 801 may determine the length of a Golay sequence. In another embodiment of the disclosure, an electronic device 101 or 801 may adaptively determine the length of a Golay sequence. In case that the length of a Golay sequence is adaptively determined, an electronic device 101 or 801 may determine an optimal length while changing the length of a Golay sequence from a long length to a short length, or may determine an optimal length while changing the length of a Golay sequence from a short length to a long length. Various methods for determining the length of a Golay sequence, which are performed by an electronic device 101 or 801, will be further described later via a flowchart.

According to various embodiments of the disclosure, in operation 903, an electronic device 101 or 801 may provide, to a wireless communication module 820, indication of transmitting a signal including a Golay sequence of a determined length, and the wireless communication module 820 may transmit a signal including a Golay sequence of the determined length according to the indication. A signal transmitted by a wireless communication module 820 may include a PPDU 310 according to an IEEE 802.11ad wireless communication scheme illustrated in FIG. 3A, may include a PPDU 350 according to an IEEE 802.11ay wireless communication scheme illustrated in FIG. 3B, may include only an STF and a CEF as illustrated in FIG. 6, or may include only a CEF. According to an embodiment of the disclosure, in case that a PPDU 310 according to an IEEE 802.11ad wireless communication scheme illustrated in FIG. 3A is transmitted, a Golay sequence having a determined length may be carried on a CEF 313 of the PPDU 310, or in case that a PPDU 350 according to an IEEE 802.11ay wireless communication scheme illustrated in FIG. 3B is transmitted, a Golay sequence having a determined length may be carried on an L-CEF 353 or an EDMG-CEF 367 of the PPDU 350. At this time, the length of a Golay sequence carried on an STF may be determined separately, may be proportional to the length of a Golay sequence determined to be carried on a CEF 313, an L-CEF 353 or an EDMG-CEF 367, or may be always constant.

All of operations 901 to 905 proposed in the disclosure as described above may be applied in case that an electronic device 101 or 801 transmits a signal to perform a radar operation or to detect another peripheral electronic device 101 or 801 and perform data communication.

Hereinafter, operations additionally performable in case that an electronic device 101 or 801 performs a radar operation will be described.

According to various embodiments of the disclosure, in operation 905, an electronic device 101 or 801 may receive a signal, which is the reflection of a signal transmitted in operation 903 from a peripheral object, through a wireless communication module 820. A signal reflected from a peripheral object may be received by an electronic device 101 or 801 after a transmitted signal experiences a delay according to twice the distance between the electronic device 101 or 801 and the object.

According to various embodiments of the disclosure, in operation 907, an electronic device 101 or 801 may acquire the property of an object reflecting a signal, based on a transmitted signal and a received signal. As illustrated in FIG. 5, an electronic device 101 or 801 may acquire a channel impulse response of a signal which is the received reflection of a plurality of transmitted signals, and may analyze or may statistically process and then analyze the acquired channel impulse response, and thus may acquire the property of an object reflecting a transmitted signal.

An electronic device 101 or 801 may perform autocorrelation as illustrated in FIGS. 4A and 4B so as to acquire a channel impulse response. An electronic device 101 or 801 may determine a delay time as k·chip time by calculating a correlation value between a received signal (for example, Y of FIG. 4A) and a signal (for example, X(k)) delayed from a transmitted signal by k times a chip time 430 and by finding k (for example, k=4 in FIG. 4A) in which a correlation value is at the peak. In addition, an electronic device 101 or 801 may detect the magnitude and phase of a received signal at a time point at which a correlation value is at the peak, and may acquire a channel impulse response. In case that a transmitted signal experiences multiple paths, multiple time points at which a correlation value is at the peak may appear, and in terms of channel impulse responses, multiple impulse responses may appear at multiple times. In one embodiment of the disclosure, only one impulse response which arrives as quickly as possible even when experiencing multiple paths and has the largest received signal magnitude may be used.

According to various embodiments of the disclosure, in operation 909, based on the acquired property of an object, an electronic device 101 or 801 may recognize the object. In an embodiment of the disclosure, in case that face recognition is to be performed by a series of operations illustrated in FIG. 9, an electronic device 101 or 801 may recognize, based on the acquired property of an object, whose face a recognized face is. In this case, the property of a face of a person to be compared may be stored in a memory 840 or a server (for example, a server 108 of FIG. 1), and an electronic device 101 or 801 may recognize a face by comparing the property of the face of a person stored in the memory 840 or the server with the acquired property.

In another embodiment of the disclosure, in case that a gesture is to be recognized by a series of operations illustrated in FIG. 9, an electronic device 101 or 801 may determine, based on the acquired property of an object, what gesture a user is currently taking or what change is made in a gesture. In this case, the property of a gesture to be compared or a change in a gesture may be stored in a memory 840 or a server (for example, a server 108 of FIG. 1), and an electronic device 101 or 801 may recognize a gesture or a change in a gesture by comparing a property stored in the memory 840 or the server with an acquired property.

In another embodiment of the disclosure, in case that a camera focus is to be adjusted by a series of operations illustrated in FIG. 9, an electronic device 101 or 801 may adjust, based on a distance among the acquired properties of an object, a camera focus. By using a series of operations illustrated in FIG. 9, an electronic device 101 or 801 may identify a distance to an object or a person to be captured by a camera, and may automatically adjust, based on the identified distance, the focus of the camera.

As described above, in case of usage for a radar operation, a wireless communication system may be applied to various applications. While a wireless communication system is applied to various applications, the length of a Golay sequence included in a transmitted signal for a radar may be adjusted so as to enhance efficiency of data communication which should be performed with a radar operation and to acquire a desired result in the least amount of time during the radar operation.

Hereinafter, according to operation 901, an operation of determining the length of a Golay sequence included in a signal transmitted by an electronic device 101 or 801 will be described.

Figure 10:
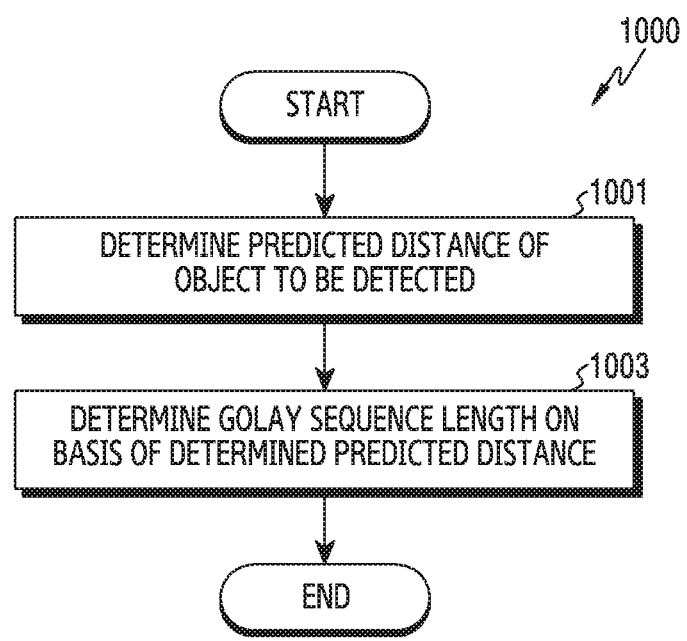
FIG. 10 is a flowchart illustrating an operation of determining, in an electronic device according to various embodiments of the disclosure, a Golay sequence length according to a predicted distance of an object to be detected according to an embodiment of the disclosure.

FIG. 10 is a flowchart 1000 illustrating an operation of determining, in an electronic device, a Golay sequence length according to a predicted distance of an object to be detected device according to an embodiment of the disclosure.

Referring to FIG. 10, it may be understood that the operating subject of the flowchart 1000 exemplified in FIG. 10 is an electronic device (for example, an electronic device 101 of FIG. 1 or an electronic device 801 of FIG. 8) or a processor (for example, a processor 120 of FIG. 1 or a processor 810 of FIG. 8) of an electronic device.

According to various embodiments of the disclosure, in operation 1001, an electronic device 101 or 801 may determine an expected distance of an object to be detected. An electronic device 101 or 801 may determine, based on an application using a radar operation, an expected distance to an object to be detected. Otherwise, a predicted distance to an object to be detected may be determined based on an input by a user. Otherwise, an expected distance may be determined based on periodical identification of the distance of a near object.

In an embodiment of the disclosure, as shown in Table 1, an electronic device 101 or 801 may confirm an object recognition distance required according to an application requesting a radar operation. In addition, an estimated distance to an object to be recognized may be determined based on a confirmed object recognition distance. According to an example in Table 1, in case of an application, such as near detection or face recognition, it may be determined that an expected distance to an object to be detected is short (within 50 cm). In case of an application, such as gesture recognition, it may be determined that an expected distance to an object to be detected is approximately medium (within 2 m). In case of an application, such as room level recognition or camera focus control, it may be determined that an expected distance to an object to be detected is long (within 10 m).

In another embodiment of the disclosure, in order to control the focus of a camera, a user may directly input an approximate estimated distance to an object to be captured by the camera.

In another embodiment of the disclosure, an electronic device 101 or 801 may periodically transmit a signal including a Golay sequence having a length of a preconfigured default size to identify a distance to a near object in advance, and may determine, based on the pre-identified distance to the near object, an expected distance when an application requiring a radar operation is executed or when a radar operation is executed. As an example, in case that it is determined that an object is located at a 1 m point in front of an electronic device as a result of periodic search, if an application, such as gesture recognition is executed, an expected distance (for example, 1 m) may be determined based on pre-identified information on a distance to an object, instead of a predesignated expected distance (for example, 2 m).

In another embodiment of the disclosure, an electronic device 101 or 801 may periodically transmit a signal including a Golay sequence having a length of a preconfigured default size, and thus may identify a distance to a near object and information on a direction in which the near object is located. In addition, an application requesting a radar function has directionality, and thus in case that an object existing in a specific direction is to be detected, an expected distance may be determined based on the pre-identified direction information and distance of the object. In an embodiment of the disclosure, in case that an application requests user authentication, an object in the front camera direction may be detected, and thus an expected distance may be detected based on a pre-identified distance to the object located in the front camera direction. In another embodiment of the disclosure, in case of an application requiring distance measurement from an object, an object in the rear camera direction may be detected, and thus an expected distance may be detected based on a pre-identified distance to the object located in the rear camera direction.

According to various embodiments of the disclosure, in operation 1003, based on a determined expected distance, an electronic device 101 or 801 may determine the length of a Golay sequence. In an embodiment of the disclosure, in case that an expected distance to a position where an object exists is short, an electronic device 101 or 801 may select a short one (for example, 610 of FIG. 6) from among a plurality of preconfigured Golay sequence lengths, and may determine the selected length as a Golay sequence length. In another embodiment of the disclosure, in case that it is identified that an expected distance to a position where an object exists is long, an electronic device 101 or 801 may select a long one (for example, 630 of FIG. 6) from among a plurality of preconfigured Golay sequence lengths, and may determine the selected length as a Golay sequence length. In another embodiment of the disclosure, in case that a predicted distance to a position where an object exists is approximately medium, an electronic device 101 or 801 may select an intermediate one (for example, 620 of FIG. 6) from among a plurality of preconfigured Golay sequence lengths, and may determine the selected length as a Golay sequence length.

Figure 11:
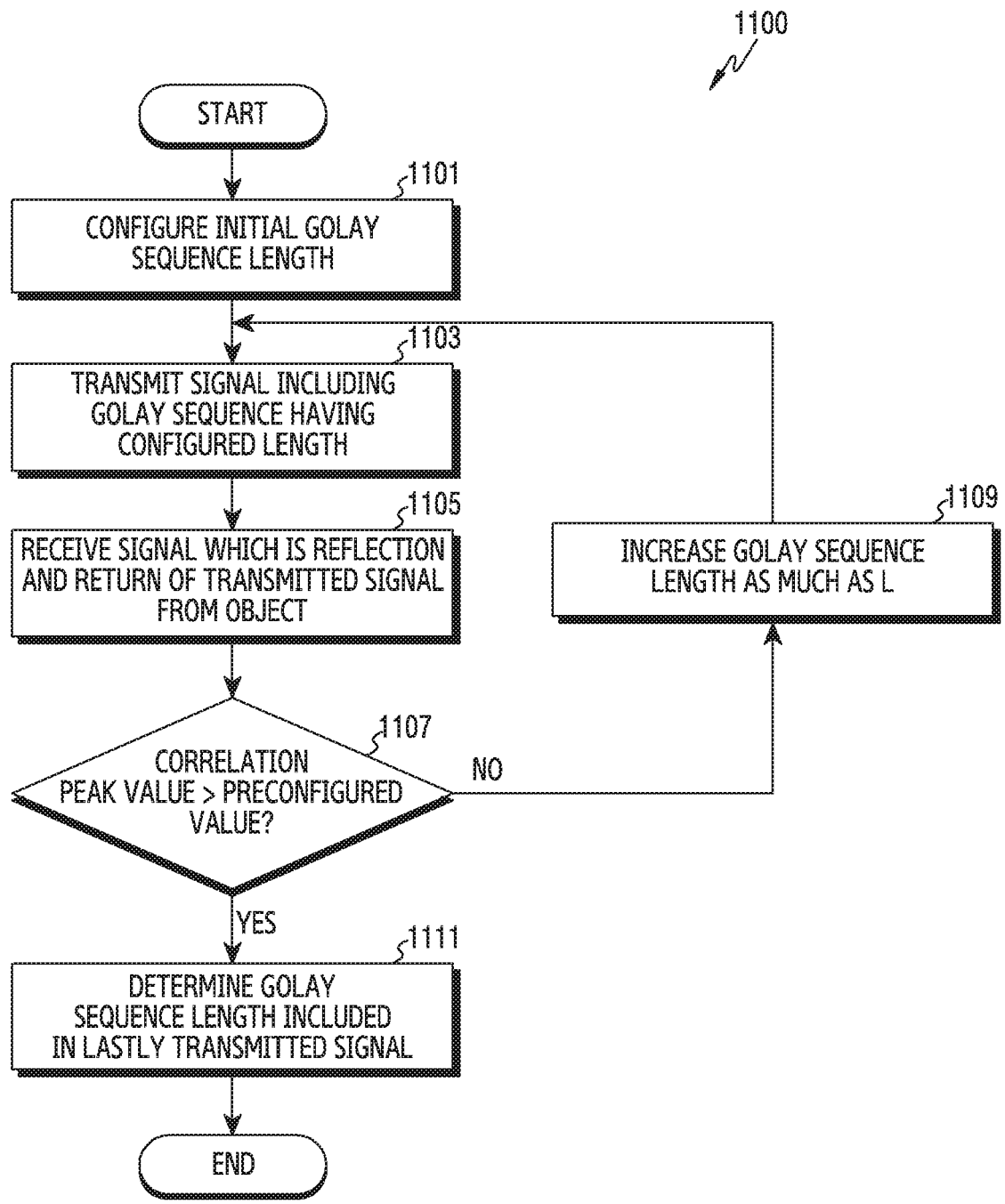
FIG. 11 is a flowchart illustrating an operation of adaptively determining a Golay sequence length of an electronic device according to an embodiment of the disclosure.

According to various embodiments of the disclosure, as described above, an electronic device 101 or 801 selects one among a plurality of preconfigured Golay sequence lengths in operations of FIG. 10 and FIG. 11. However, an electronic device 101 or 801 may determine a Golay sequence length in proportion to an object recognition distance required by an application or a predicted distance of an object to be detected. In an embodiment of the disclosure, in case that an expected distance is within 1 m, an electronic device 101 or 801 may use one of those illustrated in FIG. 3C or FIG. 6 (for example, 610 of FIG. 6), and then, every time an expected distance increases by 1 m, a Golay sequence length may be increased by a 128 chip.

FIG. 11 is a flowchart 1100 illustrating an operation of adaptively determining a Golay sequence length of an electronic device according to an embodiment of the disclosure.

Referring to FIG. 11, it may be understood that the operating subject of the flowchart 1100 exemplified in FIG. 11 is an electronic device (for example, an electronic device 101 of FIG. 1 or an electronic device 801 of FIG. 8) or a processor (for example, a processor 120 of FIG. 1 or a processor 810 of FIG. 8) of an electronic device.

According to various embodiments of the disclosure, in operation 1101, an electronic device 101 or 801 may configure an initial Golay sequence length (a first length) (for example, A). According to an embodiment of the disclosure, an initial Golay sequence length may be configured to be a configurable minimum length, or may be configured based on an expected distance to an object to be detected or a recognition distance required by an application. In another embodiment of the disclosure, an initial Golay sequence length may be configured based on whether or not data communication is currently being performed.

According to various embodiments of the disclosure, in operation 1103, an electronic device 101 or 801 may transmit a signal including a Golay sequence having a configured first length. In addition, in operation 1105, an electronic device 101 or 801 may receive a reflection signal which is the reflection and return of a transmitted signal from an object. In case that there is no object to reflect a signal, there may be no reflection signal or there may be simple noise.

According to various embodiments of the disclosure, in operation 1107, an electronic device 101 or 801 may determine whether or not a peak value acquired by performing correlation between a received reflection signal and signals delaying a transmitted signal is larger than or equal to a preconfigured value, as illustrated in FIGS. 4A and 4B.

According to various embodiments of the disclosure, if a peak value is smaller than a preconfigured value, in operation 1109, a Golay sequence length may be increased as much as a designated length (for example, L) to be made into a second length. In addition, an electronic device 101 or 801 may re-perform operations 1103, 1105, and 1107. Operations 1103, 1105, 1107, and 1109 may be repeatedly performed until a peak value acquired at every performance is greater than or equal to a preconfigured value. According to another embodiment of the disclosure, although not illustrated, if the length of a Golay sequence becomes larger than a configurable maximum length, it may be determined that an object does not exist or that an external object causing a reflection signal is not a recognizing target. Thereafter, a radar operation may be stopped, and/or notification may be provided to a user.

According to various embodiments of the disclosure, if an acquired peak value is larger than a preconfigured value in operation 1107, in operation 1111, a Golay sequence length (for example, A+3L) included in a lastly transmitted signal may be determined as a Golay sequence length to be used for a radar operation later.

Figure 12:
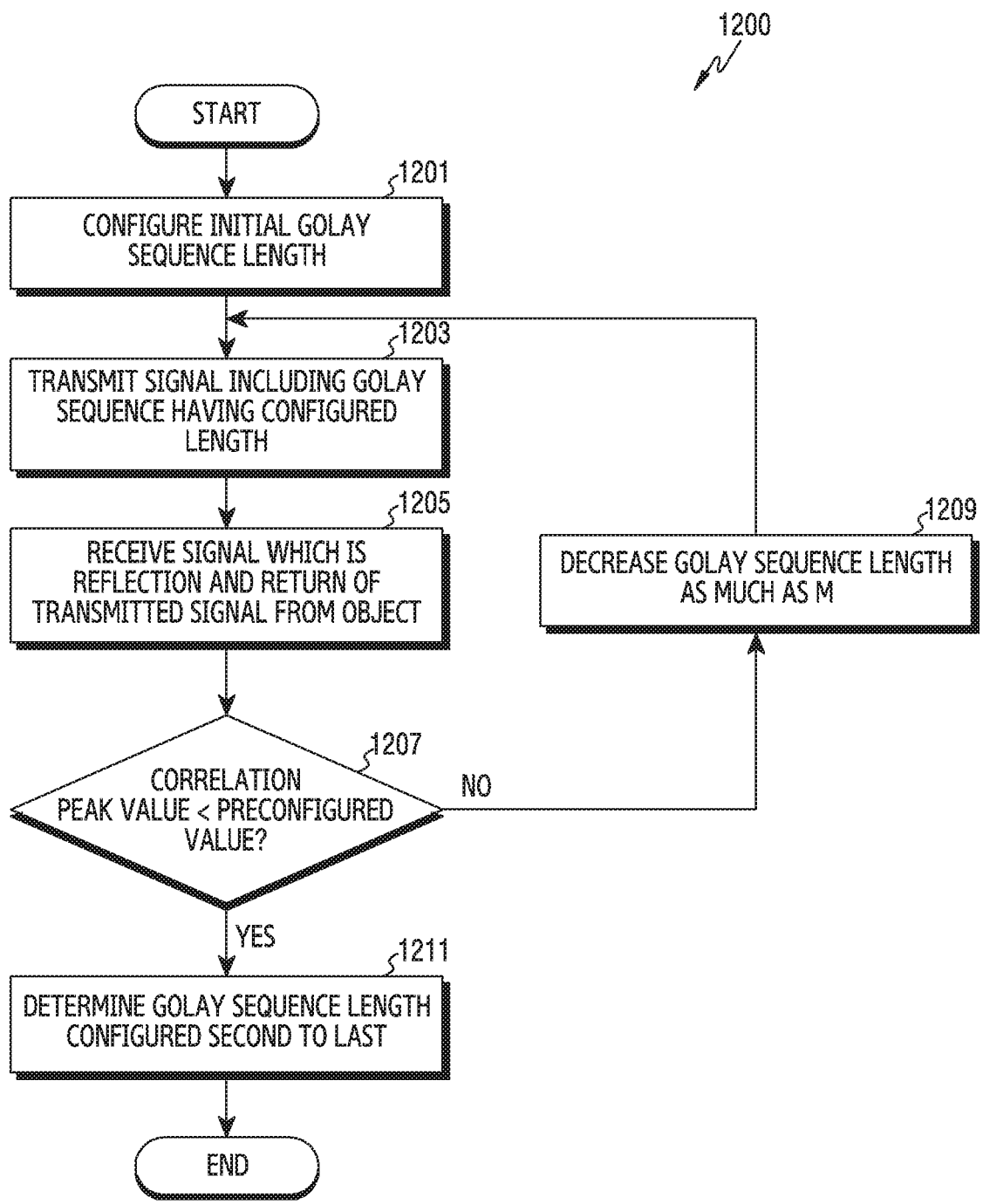
FIG. 12 is a flowchart illustrating an operation of adaptively determining a Golay sequence length of an electronic device according to an embodiment of the disclosure.

FIG. 12 is a flowchart 1200 illustrating an operation of adaptively determining a Golay sequence length of an electronic device according to an embodiment of the disclosure.

Referring to FIG. 12, it may be understood that the operating subject of the flowchart 1200 exemplified in FIG. 12 is an electronic device (for example, an electronic device 101 of FIG. 1 or an electronic device 801 of FIG. 8) or a processor (for example, a processor 120 of FIG. 1 or a processor 810 of FIG. 8) of an electronic device.

According to various embodiments of the disclosure, in operation 1201, an electronic device 101 or 801 may configure an initial Golay sequence length (for example, Z). According to an embodiment of the disclosure, an initial Golay sequence length may be configured to be a configurable maximum length, or may be configured based on an expected distance to an object to be detected or a recognition distance required by an application. In an embodiment of the disclosure, an initial Golay sequence length may be configured based on whether or not data communication is currently being performed.

According to various embodiments of the disclosure, in operation 1203, an electronic device 101 or 801 may transmit a signal including a Golay sequence having a configured length. In addition, in operation 1205, an electronic device 101 or 801 may receive a reflection signal which is the reflection and return of a transmitted signal from an object.

According to various embodiments of the disclosure, in operation 1207, an electronic device 101 or 801 may determine whether or not a peak value acquired by performing correlation between a received signal and signals delaying a transmitted signal is smaller than or equal to a preconfigured value, as illustrated in FIGS. 4A and 4B.

According to various embodiments of the disclosure, if a peak value is larger than a preconfigured value, in operation 1209, a Golay sequence length may be decreased as much as a designated length (for example, M). In addition, an electronic device 101 or 801 may re-perform operations 1203, 1205, and 1207. Operations 1203, 1205, 1207, and 1209 may be repeatedly performed until a peak value acquired at every performance is smaller than or equal to a preconfigured value.

According to various embodiments of the disclosure, if a peak value is smaller than or equal to a preconfigured value in operation 1207, in operation 1211, a Golay sequence length (for example, Z-2M) configured second to last may be determined as a Golay sequence length to be used for a radar operation later. However, in the above-described operation, although not illustrated, if operation 1211 is immediately performed while operation 1209 is not performed even once, it may be determined that an object does not exist. Thereafter, a radar operation may be stopped, and/or notification may be provided to a user.

According to various embodiments of the disclosure, a preconfigured signal intensity used for identification in FIG. 11 and FIG. 12 may be differently configured by the type of application or a predicted distance to an object to be detected.

According to various embodiments of the disclosure, based on whether or not data communication with an external electronic device is being performed, an electronic device 101 or 801 may determine whether to use operations of FIG. 11 or whether to use operations of FIG. 12.

When a device for wireless communication, provided in an electronic device, is utilized for a radar function by using a method for determining a Golay sequence length according to the above-described various embodiments of the disclosure, object recognition efficiency and data communication efficiency may be enhanced.

According to various embodiments of the disclosure, a method for operating an electronic device (for example, an electronic device 101 of FIG. 1 or an electronic device 801 of FIG. 8) may include: estimating a predicted distance to an external object; determining, based on the estimated predicted distance, the length of a Golay sequence included in a signal for recognizing the external object; and transmitting at least one signal including a Golay sequence having the determined length.

According to various embodiments of the disclosure, the method may further include: receiving at least one signal which is the reflection and return of the at least one transmitted signal from the external object; acquiring, based on the at least one transmitted signal and the at least one received signal, the property of the external object; and recognizing, based on the acquired property of the object, the object.

According to various embodiments of the disclosure, the estimating of the predicted distance to the external object may include estimating, based on the type of application using recognition of the external object or based on configuration according to an input by a user, a predicted distance to the external object.

According to various embodiments of the disclosure, the determining of the length of the Golay sequence may include determining, as the length of the Golay sequence, one among a plurality of Golay sequence lengths preconfigured based on the estimated predicted distance.

According to various embodiments of the disclosure, the method may further include configuring the plurality of preconfigured Golay sequence lengths, based on the state of the electronic device, the state including the intensity of a peripheral noise signal.

According to various embodiments of the disclosure, the determining of the length of the Golay sequence may include determining, in proportion to the estimated predicted distance, the length of the Golay sequence.

According to various embodiments of the disclosure, the determining of the length of the Golay sequence may include: identifying, through a wireless communication module, whether or not data communication with an external electronic device is being performed; and determining, based on the result of the identification, the length of a Golay sequence included in a signal for recognizing the external object.

According to various embodiments of the disclosure, a method for operating an electronic device (for example, an electronic device 101 of FIG. 1 or an electronic device 801 of FIG. 8) may include: transmitting, to an external object, at least two signals including Golay sequences having different lengths from each other, so as to determine the length of a Golay sequence included in a signal for recognizing the external object; and transmitting at least one signal including a Golay sequence having the determined length.

According to various embodiments of the disclosure, the method may further include: receiving at least one signal which is the reflection and return of the at least one transmitted wireless signal from the external object; acquiring, based on the at least one transmitted signal and the at least one received signal, the property of the external object; and recognizing, based on the acquired property of the object, the object.

According to various embodiments of the disclosure, the determining of the length of the Golay sequence may include: configuring a Golay sequence length as a first length; transmitting at least one first signal including a Golay sequence having the configured first length; receiving at least one first reflection signal which is the reflection and return of the at least one transmitted first signal from the external object; identifying whether or not a first peak value obtained by performing correlation between the at least one received first reflection signal and signals delaying the transmitted first signal is larger than a preconfigured value; in case that, as a result of the identification, the first peak value is smaller than the preconfigured value, increasing the Golay sequence length as much as a designated length to configure an increased length as a second length, transmitting at least one second signal including a Golay sequence having the configured second length, receiving at least one second reflection signal which is the reflection and return of the at least one transmitted second signal from the external object, and identifying whether or not a second peak value acquired by performing correlation between the at least one received second reflection signal and signals delaying the transmitted second signal is larger than the preconfigured value; and in case that, as a result of the identification, the second peak value is larger than the preconfigured value, determining, as the second length, the length of the Golay sequence.

According to various embodiments of the disclosure, the method may further include identifying that the external object is not a recognizing target and stopping a radar operation, in case that the determined Golay sequence length is larger than a configurable maximum Golay sequence length.

According to various embodiments of the disclosure, the determining of the length of the Golay sequence may include: configuring a Golay sequence length as a first length; transmitting at least one first signal including a Golay sequence having the configured first length; receiving at least one first reflection signal which is the reflection and return of the at least one transmitted first signal from the external object; identifying whether or not a first peak value acquired by performing correlation between the at least one received first reflection signal and signals delaying the transmitted first signal is smaller than a preconfigured value; in case that, as a result of the identification, the first peak value is smaller than the preconfigured value, determining, as the first length, the length of a Golay sequence included in a signal for recognizing the external object; in case that, as a result of the identification, the first peak value is larger than the preconfigured value, decreasing the configured Golay sequence length as much as a designated length and configuring a decreased length as a second length, transmitting at least one second signal including a Golay sequence having the configured second length, receiving at least one second reflection signal which is the reflection and return of the at least one transmitted second signal from the external object, and repeating an operation of identifying whether or not a second peak value acquired by performing correlation between the at least one received second reflection signal and signals delaying the transmitted second signal is larger than the preconfigured value; and in case that, as a result of the identification, the second peak value is smaller than the preconfigured value, determining, as the first length, the length of the Golay sequence.

According to various embodiments of the disclosure, the method may further include identifying that the external object is not a recognizing target and stopping a radar operation, in case that, based on a case that the first peak value is smaller than the preconfigured value, the Golay sequence length is determined as the first length.

According to various embodiments of the disclosure, the configuring of the Golay sequence length as the first length may include identifying, through a wireless communication module, whether or not data communication with an external electronic device is being performed; and configuring, based on the result of the identification, the first length.

According to various embodiments of the disclosure, the transmitting of the at least one signal may include transmitting at least one signal according to an IEEE 802.11ad or IEEE 802.11ay wireless communication scheme, and the signal may be a physical layer protocol data unit (PPDU) of the IEEE 802.11ad or IEEE 802.11ay.

According to various embodiments of the disclosure, the signal may include only a short training field (STF) for timing adjustment at the time of reception and a channel estimation field (CEF) for estimating a channel impulse response of a received signal, and the transmitting of the at least one signal may include transmitting a Golay sequence having a determined length in a state where the Golay sequence is carried on a CEF.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication module configured to transmit a signal for recognizing an external object;
at least one processor operably connected to the wireless communication module; and
at least one memory operably connected to the at least one processor,
wherein the at least one memory is configured to store instructions for causing the at least one processor, when executed, to:
estimate a predicted distance to the external object,
identify, through the wireless communication module, whether or not data communication with an external electronic device is being performed,
determine, based on the estimated predicted distance and a result of the identification, a length of a Golay sequence to be included in a signal for recognizing the external object, and
control the wireless communication module so as to transmit at least one signal including the Golay sequence having the determined length.

2. The electronic device of claim 1, wherein the instructions further cause the at least one processor to:
control the wireless communication module so as to receive at least one signal which is a reflection and return of the transmitted at least one signal from the external object,
acquire, based on the at least one transmitted signal and the at least one received signal, a property of the external object, and
recognize, based on the acquired property of the external object, the external object.

3. The electronic device of claim 1, wherein the instructions further cause the at least one processor to estimate, based on a type of an application using recognition of the external object or based on configuration according to an input by a user, the predicted distance to the external object.

4. The electronic device of claim 1,
wherein the instructions further cause the at least one processor to determine, as the length of the Golay sequence to be included in the signal for recognizing the external object, one among a plurality of Golay sequence lengths based on the estimated predicted distance and the result of the identification, and
wherein the plurality of the Golay sequence lengths are preconfigured.

5. The electronic device of claim 4, wherein the preconfigured Golay sequence lengths are configured to be different from each other, based on a state of the electronic device, the state including an intensity of a peripheral noise signal.

6. The electronic device of claim 1, wherein the instructions further cause the at least one processor to determine, in proportion to the estimated predicted distance, the length of the Golay sequence to be included in the signal for recognizing the external object.

7. A method for operating an electronic device comprising a wireless communication module configured to transmit a signal for recognizing an external object, at least one processor operably connected to the wireless communication module and at least one memory operably connected to the at least one processor, the method comprising:
estimating a predicted distance to the external object;
identifying, through the wireless communication module, whether or not data communication with an external electronic device is being performed;
determining, based on the estimated predicted distance and a result of the identification, a length of a Golay sequence to be included in a signal for recognizing the external object; and
controlling the wireless communication module to transmit at least one signal including the Golay sequence having the determined length.

8. The method of claim 7, further comprising:
controlling the wireless communication module to receive at least one signal which is a reflection and return of the at least one transmitted signal from the external object;
acquiring, based on the at least one transmitted signal and the at least one received signal, a property of the external object; and
recognizing, based on the acquired property of the external object, the external object.

9. The method of claim 7, wherein the estimating of the predicted distance to the external object comprises estimating, based on a type of an application using recognition of the external object or based on configuration according to an input by a user, the predicted distance to the external object.

10. The method of claim 7,
   wherein the determining of the length of the Golay sequence comprises determining, as the length of the Golay sequence, one among a plurality of Golay sequence lengths based on the estimated predicted distance and the result of the identification, and
   wherein the plurality of the Golay sequence lengths are preconfigured.

11. The method of claim 10, further comprising configuring a plurality of preconfigured Golay sequence lengths, based on a state of the electronic device, the state including an intensity of a peripheral noise signal.

12. The method of claim 7, wherein the determining of the length of the Golay sequence comprises determining, in proportion to the estimated predicted distance, the length of the Golay sequence.

\* \* \* \* \*